United States Patent
Leu

[11] Patent Number: 5,907,479
[45] Date of Patent: May 25, 1999

[54] INTEGRATED FILTER FORWARD CONVERTERS

[76] Inventor: Sam C. Leu, P.O. Box 63-99, Taichung, Taiwan

[21] Appl. No.: 08/992,247

[22] Filed: Dec. 17, 1997

[51] Int. Cl.$^6$ ............................ H02M 3/335; H02M 3/24; H02M 2/537
[52] U.S. Cl. .................. 363/16; 363/15; 363/17; 363/97; 363/131; 363/20; 363/21
[58] Field of Search ................... 363/15, 16, 17, 363/20, 21, 97, 131

[56] References Cited

U.S. PATENT DOCUMENTS

| | | |
|---|---|---|
| 4,618,919 | 10/1986 | Martin, Jr. .................................. 363/21 |
| 4,864,479 | 9/1989 | Steigerwald et al. ...................... 363/17 |
| 5,019,954 | 5/1991 | Bourgeault et al. ...................... 363/21 |
| 5,132,888 | 7/1992 | Lo et al. .................................... 363/17 |
| 5,523,936 | 6/1996 | Leu et al. .................................. 363/21 |
| 5,555,494 | 9/1996 | Morris ....................................... 363/17 |
| 5,640,318 | 6/1997 | Leu ........................................... 363/131 |

*Primary Examiner*—Shawn Riley
*Assistant Examiner*—Rajnikant B. Patel

[57] ABSTRACT

A family of integrated filter forward converters includes a filter inductor is magnetically included in the transformer assembly. A basic circuit includes a DC voltage source, two cross-coupled capacitors, a clamp diode, a power switch, two identical transformers (or equivalent to a transformer and a filter inductor), two rectifying diodes, a filter capacitor and a load resistor. Several useful versions can be obtained by modifying the basic circuit for different applications. Both the input and output currents of the present invention can yield continuous current operation.

10 Claims, 22 Drawing Sheets

INTEGRATED FILTER FORWARD CONVERTERS

BACKGROUND OF THE INVENTION

1. Field of the Invention

The present invention relates to a family of integrated filter forward converter having continuous input and output currents.

2. Description of the Prior Art

U.S. Pat. No. 5,523,936 issued to Leu et. al. discloses a built-in input filter forward converter for dc-dc applications and U.S. Pat. No. 5,640,318 issued to Leu discloses another forward converter for off-line applications. FIGS. 1A and 1B illustrate such two prior arts of forward converter each having input filter function being magnetically included in the transformer assembly. Wherein power switch, clamp diode and two cross-coupled capacitors are respectively connected to a split-winding transformer. When the power switch is turned off, the transformer leakage inductance and cross-coupled capacitors form an effective input filter without interrupting the input current of the converter. Hence, continuous input current is maintained with no external input inductor required. However, both patented forward converters are single-ended, that is, both only operate as half-wave mode and still require an output filter inductor for smoothing the output current. A full-bridge topology that integrates transformer and output inductor magnetic functions into common magnetic assembly in U.S. Pat. No. 5,555,494 to George Q. Morris. FIG. 1C illustrates such a prior art of forward converter. However, Morris converter requires a large input filter to reduce the noises caused by a pulsating input current of a full-bridge converter.

SUMMARY OF THE INVENTION

The first embodiment of the present invention discloses a double two-switch integrated filter forward converter is implemented with one transformer and one output inductor structure that has input filter function being magnetically included in the transformer assembly with better magnetic utilization for high-power applications. Referring to FIG. 2, the double two-switch integrated filter forward converter consists of a DC voltage source (Vi), one transformer (X1) having four primary windings (P11, P12, P21, P22) and two secondary windings (S1, S2). Two pairs of two series-connected power switches (SW1–SW2, SW3–SW4), two clamp diodes (DV1, DV2), two cross-coupled capacitors (C1, C2) being connected to the primary winding of the transformer and two rectifying diodes (D1, D2), a filter inductor (Lf), a filter capacitor (Co), and a load resistor (RL) being connected to the secondary winding of the transformer. Note that the dots marked near the windings of transformers later mentioned are used to show the instantaneous positive polarity of alternating voltage induced in the windings as a result of transformer action and are named "the first ends" of the windings hereinafter.

The first end of the winding P11 and the second end of the winding P22 being connected to the positive electrode of the voltage source Vi. The first end of the winding P12 and the second end of the winding P21 are connected to the negative electrode of the voltage source. The series-connected power switches SW1–SW2 connected between the second end of the winding P11 and the first end of the winding P21 and defining a first common point P between the power switches. The series-connected power switches SW3–SW4 connected between the second end of the winding P12 and the first end of the winding P22 and defining a second common point Q between the power switches. A first clamp diode Dv1 connected between the second common point Q of the power switches SW3–SW4 and the second end of the winding P11. A second clamp diode Dv2 connected between the first common point P of the power switches SW1–SW2 and the first end of the winding P22. A first cross-coupled capacitor C1 connected between the second ends of the windings P11 and P12, and a second cross-coupled capacitor C2 connected between the first ends of the windings P21 and P22.

Secondary windings S1 and S2 are wound on transformer X1, magnetically coupled to primary windings P11, P12, P21 and P22. The second end of the winding S1 is connected to the first end of the winding S2. Rectifier D1 is connected in series with secondary winding S1 for rectifying current flow in S1; and rectifier D2 is connected in series with secondary winding S2 for rectifying current flow in S2. Converter output connection terminals +Vo and RETURN are available for connecting to the load to be powered by the converter; connection +Vo will be positive with respect to RETURN. The ends of S1 and S2 that are opposite their respective connections with D1 and D2 are connected to terminal RETURN. The cathodes of D1 and D2 are connected together, and connected to the first end of the filter inductor Lf. The second end of the filter inductor Lf is connected to terminal +Vo. An output filter capacitor Co is connected across the terminals +Vo and RETURN. The converter delivers output power to a load shown at RL, which is connected across terminals +Vo and RETURN.

A DC input voltage is alternatively switched across primary windings P11–P21 and P12–P22. During one half-cycle, one secondary winding S1 transfers power from primary to the load, while the other secondary winding S2 is open. During the other half-cycle, the secondary windings reverse operations. During dead-time period when the primary switches are not conducting, transformer releases magnetizing energy to the cross-coupled capacitors.

Continuous input current characteristic is thus maintained and no separate input filter inductor is required. Hence, it can effectively provide the power transfer and input filter function with better magnetic utilization due to operating in full-wave mode resulting in improving converter efficiency and increasing converter density.

The second embodiment of the present invention discloses integrated filter forward converters so that the functions of the input and output filter inductor are both magnetically included in the transformer assembly. FIGS. 5A, 5B and 5C are three members of this forward converter family: double two-switch integrated filter forward converter, two-switch integrated filter forward converter and single-switch integrated filter forward converter, respectively. Referring to FIG. 5A, the double two-switch integrated filter forward converter, taken as an example, consists of a DC voltage source (Vi), two identical transformers (X1, X2) each having two primary windings (P11–P12, P21–P22) and one secondary winding (S1, S2), two pairs of two series-connected power switches (SW1–SW2, SW3–SW4), two clamp diodes (DV1, DV2), two cross-coupled capacitors (C1, C2) being connected to the primary winding of the transformers and two rectifying diodes (D1, D2), a filter capacitor (Co), and a load resistor (RL) being connected to the secondary winding of the transformers. Each winding has a first end and a second end. The first end of the winding P11 and the second end of the winding P22 being connected to the positive electrode of the voltage source Vi. The first end of the winding P12 and the second end of the winding P21 are connected to the negative electrode of the voltage source. The series-connected power switches SW1–SW2 connected between the second end of the winding P11 and the first end of the winding P21 and defining a first common point P between the power switches. The series-connected power switches SW3–SW4 connected between the second end of the winding P12 and the first end of the winding P22 and defining a second common point Q between the power switches. A first clamp diode DV1 connected between the second common point Q of the power switches SW3–SW4 and the second end of the winding P11. A second clamp diode DV2 connected between the first common point P of the power switches SW1–SW2 and the first end of the winding P22. A first cross-coupled capacitor C1 connected between the second ends of the windings P11 and P12, and a second cross-coupled capacitor C2 connected between the first ends of the windings P21 and P22.

Secondary winding S1 is wound on transformer X1, magnetically coupled to primary winding P11 and P12.

Secondary winding S2 is wound on transformer X2, magnetically coupled to primary winding P21 and P22. The second end of the winding S1 is connected to the first end of the winding S2. Rectifier D1 is connected in series with secondary winding S1 for rectifying current flow in S1; and rectifier D2 is connected in series with secondary winding S2 for rectifying current flow in S2. Converter output connection terminals +Vo and RETURN are available for connecting to the load to be powered by the converter; connection +Vo will be positive with respect to RETURN.

The cathodes of D1 and D2 are connected together, and connected to terminal +Vo. The ends of S1 and S2 that are opposite their respective connections with D1 and D2 are connected to terminal RETURN. An output filter capacitor Co is connected across the terminals +Vo and RETURN. The converter delivers output power to a load shown at RL, which is connected across terminals +Vo and RETURN.

A DC input voltage is alternatively switched across primary windings P11–P21 and P12–P22. During one half-cycle, one transformer transfers power from primary to the load, while the other transformer is open so that its core flux increases to store energy. During the other half-cycle, the transformers reverse roles. During dead-time period when the primary switches are not conducting, both transformers release energy to the cross-coupled capacitors and the secondary windings. Continuous input and output current characteristics are thus maintained and no separate input and output filter inductors are required. Hence, it can effectively provide the power transfer and input/output filter functions with improving converter efficiency, increasing converter density, reduced expense and complexity, and lower winding and core loss.

OBJECTS AND ADVANTAGES

The present invention discloses integrated filter forward converters that operate advantageously with a magnetically integrated structure combining transformer, input and/or output inductor functions.

Accordingly, it is one object of the present invention to disclose integrated filter forward converter capable of delivering continuous input current via transformer primary windings and cross-coupled capacitors, wherein the primary leakage inductance is used as an input inductor to provide this continuous input current.

Another object of the present invention is to disclose integrated filter forward converter delivering continuous output current from two secondary transformer windings without series inductor windings required to provide this continuous output current.

Another object of the present invention is to disclose integrated filter forward converter with a leakage inductance and two cross-coupled capacitors being a lossless snubber.

Another object of the present invention is to disclose integrated filter forward converter with two cross-coupled capacitors for storing and recovering leakage energy thereby improving the converter efficiency.

Another object of the present invention is to be able to implement an embodiment of integrated filter forward converter utilizing an integrated magnetic assembly wherein all primary and secondary windings can be located on a single core.

Another object of the present invention is to disclose integrated filter forward converter wherein multiple outputs can be obtained without adding external separate output filter inductor for each forward converter output.

Another object of the present invention is to disclose double two-switch integrated filter forward converter wherein at least two of the multiple outputs can be fully regulated by using tw o separate PWM (pulse-width-modulation) controllers.

Other objects, advantages, and novel feature of the invention will become m ore apparent from the following detailed description when taken in conjunction with the accompanying drawings, in which:

DETAILED DESCRIPTION OF THE PREFERRED EMBODIMENTS

Figure 1A:
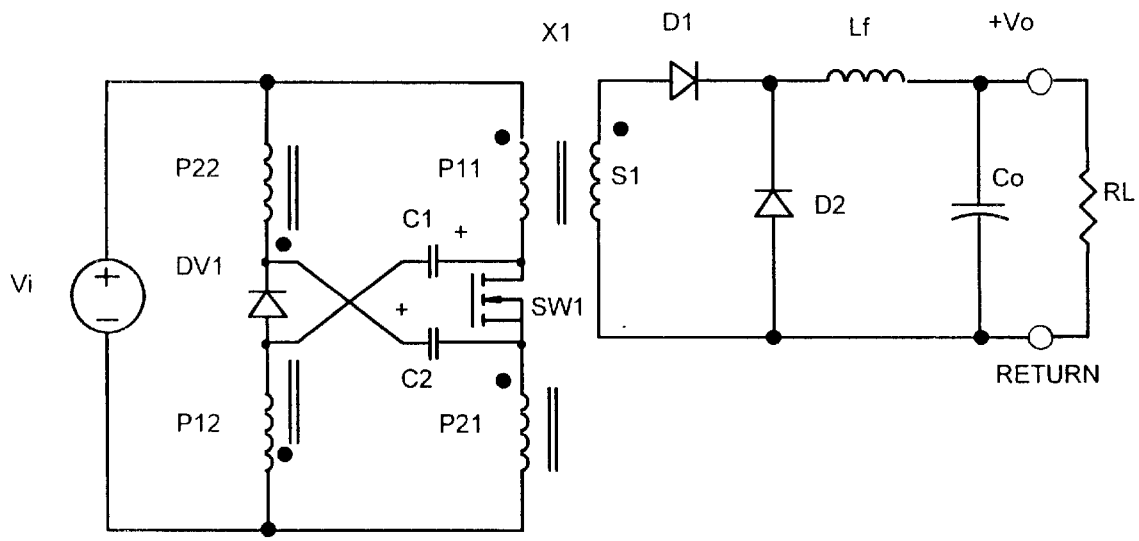
FIGS. 1A, 1B and 1C illustrate three prior arts of forward converter.
Figure 1B:
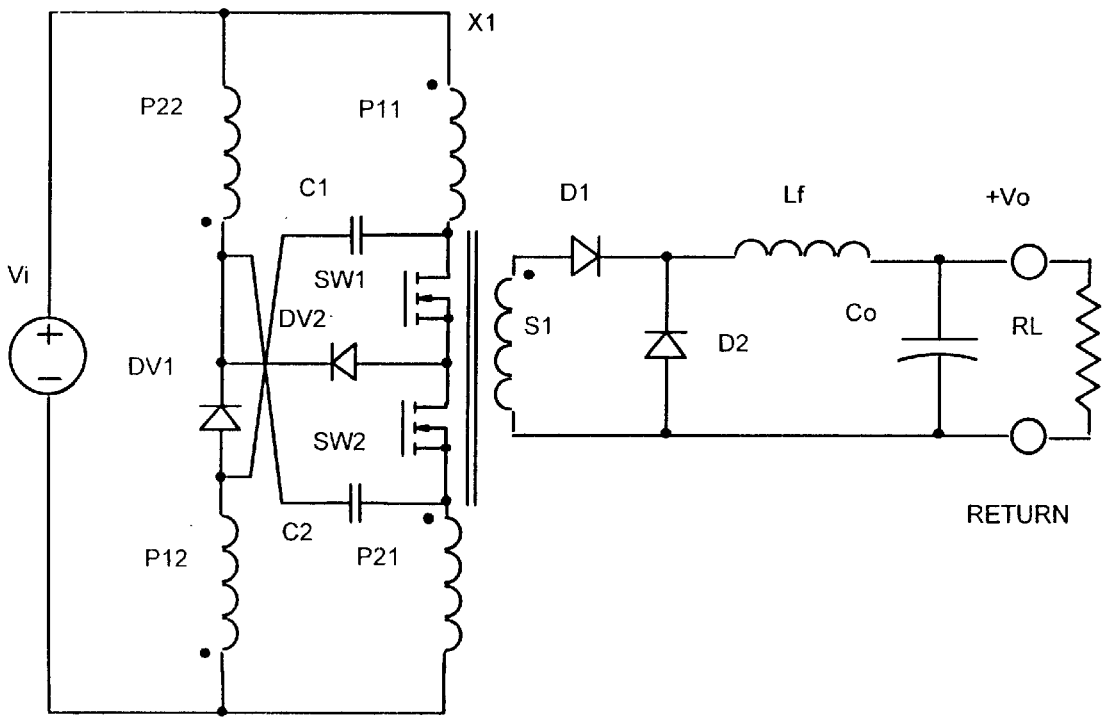
Figure 1C:
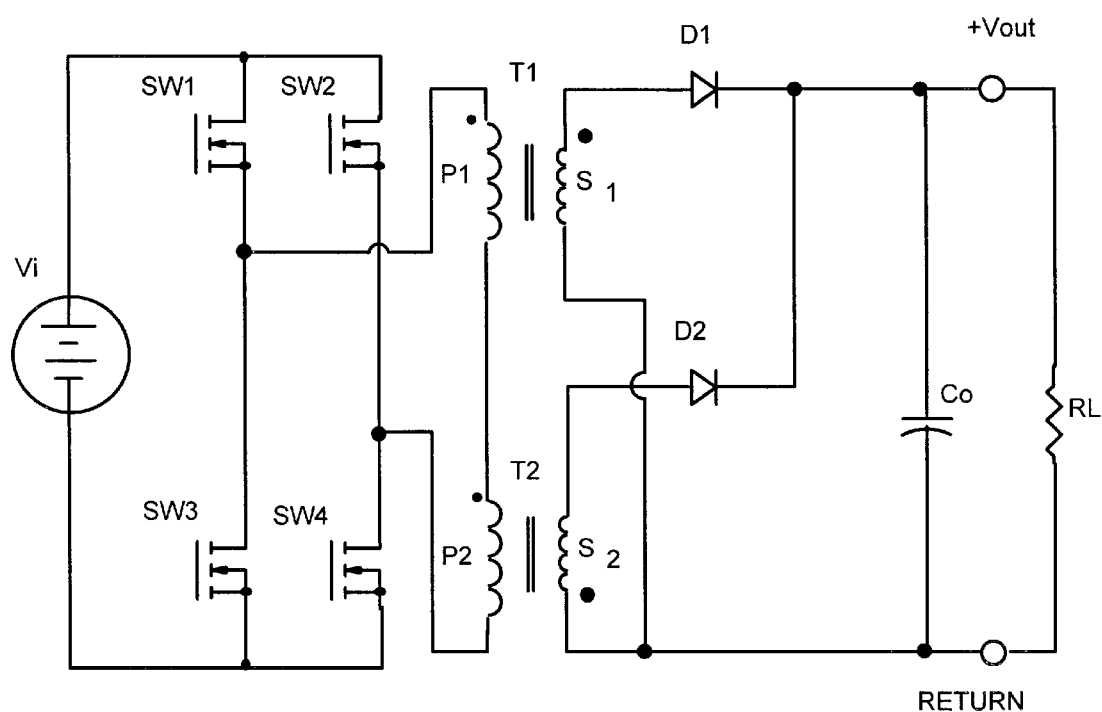

Referring now to drawings wherein like reference characters designate identical or corresponding parts through the several views.

Figure 2:
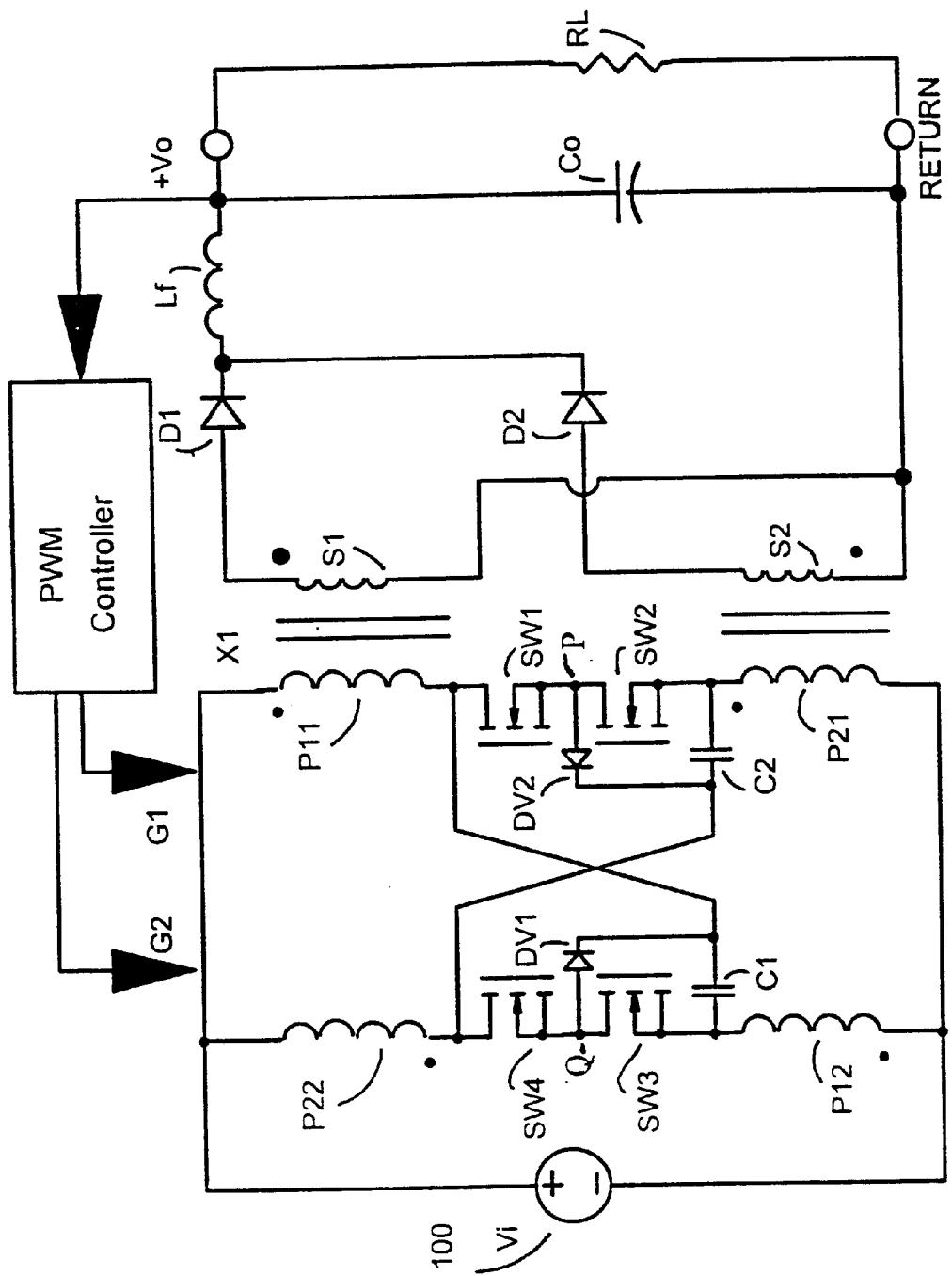
FIG. 2 is a circuit diagram of a double two-switch integrated filter forward converter to a first embodiment of the present invention that is implemented with one transformer and one output inductor structure.

Referring to FIG. 2, a circuit diagram of a form of the invention, double two-switch integrated filter forward converter, is shown. The converter is implemented with a transformer and an output inductor structure that has input filter function being magnetically included in the transformer assembly with better magnetics utilization for high-power applications. The converter includes a low impedance source of input voltage Vi (100) having a positive electrode and a negative electrode, a transformer X1. Two pairs of series-connected power switches SW1–SW2 and SW3–SW4, two clamp diodes Dv1–Dv2, and two cross-coupled capacitors C1–C2 being connected to the primary of the transformer and two rectifying diodes D1–D2, a filter capacitor Co, a filter inductor Lf and a load resistor RL being connected to the secondary winding of the transformer.

The transformer has four primary windings, P11–P12–P21–P22, and two secondary windings, S1–S2. Each winding has a has a first end and a second end. The polarity of all windings is as shown by the conventional polarity dot notation. The second end of P22 winding and the first end of P11 winding being connected to the positive electrode of the voltage source Vi. The first end of P12 winding and the second end of P21 winding are connected to the negative electrode of the voltage source Vi. The core of transformer X1 must be designed to be capable of transferring the desired output power for proper operation with operating frequency of the converter.

Four power MOSFETs divide into two series-connected pairs. Each MOSFET has a gate receiving a control pulse from a pulse-width-modulation PWM controller. The first series-connected power switches SW1, SW2 connected between the second end of the P11 winding and the first end of the P21 winding and defining a first common point P between the MOSFETs SW1, SW2. The second series-connected power switches SW3, SW4 connected between the second end of P12 winding and the first end of the P22 winding and defining a second common point Q between the power switches SW3, Sw4.

A first clamp diode DV1 connected between the second common point Q of the power switches SW3–SW4 and the second end of the P11 winding. A second clamp diode DV2 connected between the first common point P of the power switches SW1–SW2 and the first end of the P22 winding. A first cross-coupled capacitor C1 connected between the second ends of the P11–P12 windings, and a second cross-coupled capacitor C2 connected between the first ends of the P21–P22 windings. The second end of the S1 winding is connected to the first end of the S2 winding. Rectifier D1 is connected in series with secondary winding S1 for rectifying current flow in S1; and Rectifier D2 is connected in series with secondary winding S2 for rectifying current flow in S2.

Converter output connection terminals +Vo and RETURN are available for connecting to the load to be powered by the converter; connection +Vo will be positive with respect to RETURN. The cathodes of D1 and D2 are connected together, and connected to the first end of the filter inductor Lf. The second end of the filter inductor Lf is connected to terminal +Vo. The ends of S1 and S2 that are opposite their respective connections with D1 and D2 are connected to terminal RETURN. An output and filter capacitor Co is connected across the terminals +Vo and RETURN. The converter delivers output power to a load shown at RL, which is connected across terminals +Vo and RETURN.

By comparing the output voltage with a stable reference voltage, PWM controller issues output control signals G1 and G2 for opening and closing the power switches at a fixed operating frequency. The G1 and G2 signals are out of phase with each other to operate switches SW1 through SW4 in a pulse width modulation scheme. Signal G1 causes the switches SW1 and SW2 to close (switch ON) while switches SW3 and SW4 are open (switch OFF) by the appropriate command from G2. This causes the summed voltage across windings P11 and P21 to input voltage. For the other half cycle the roles are reversed; G2 commands SW3 and SW4 ON while G1 commands SW1 and SW2 OFF. This causes the summed voltage across windings P12 and P22 to input voltage.

Figure 3:
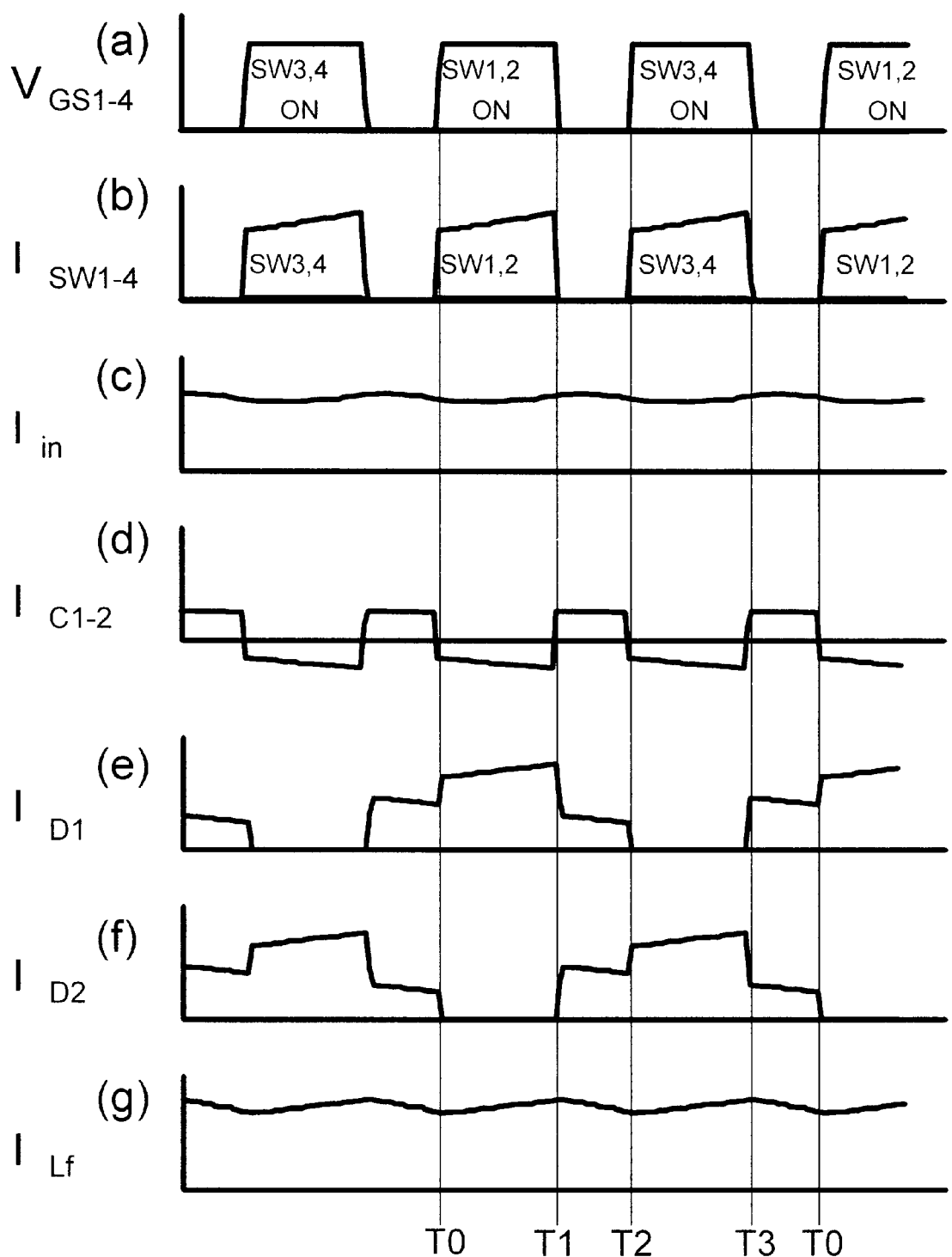
FIG. 3 illustrates current waveforms in double two-switch integrated filter forward converter of the invention.
Figure 4:
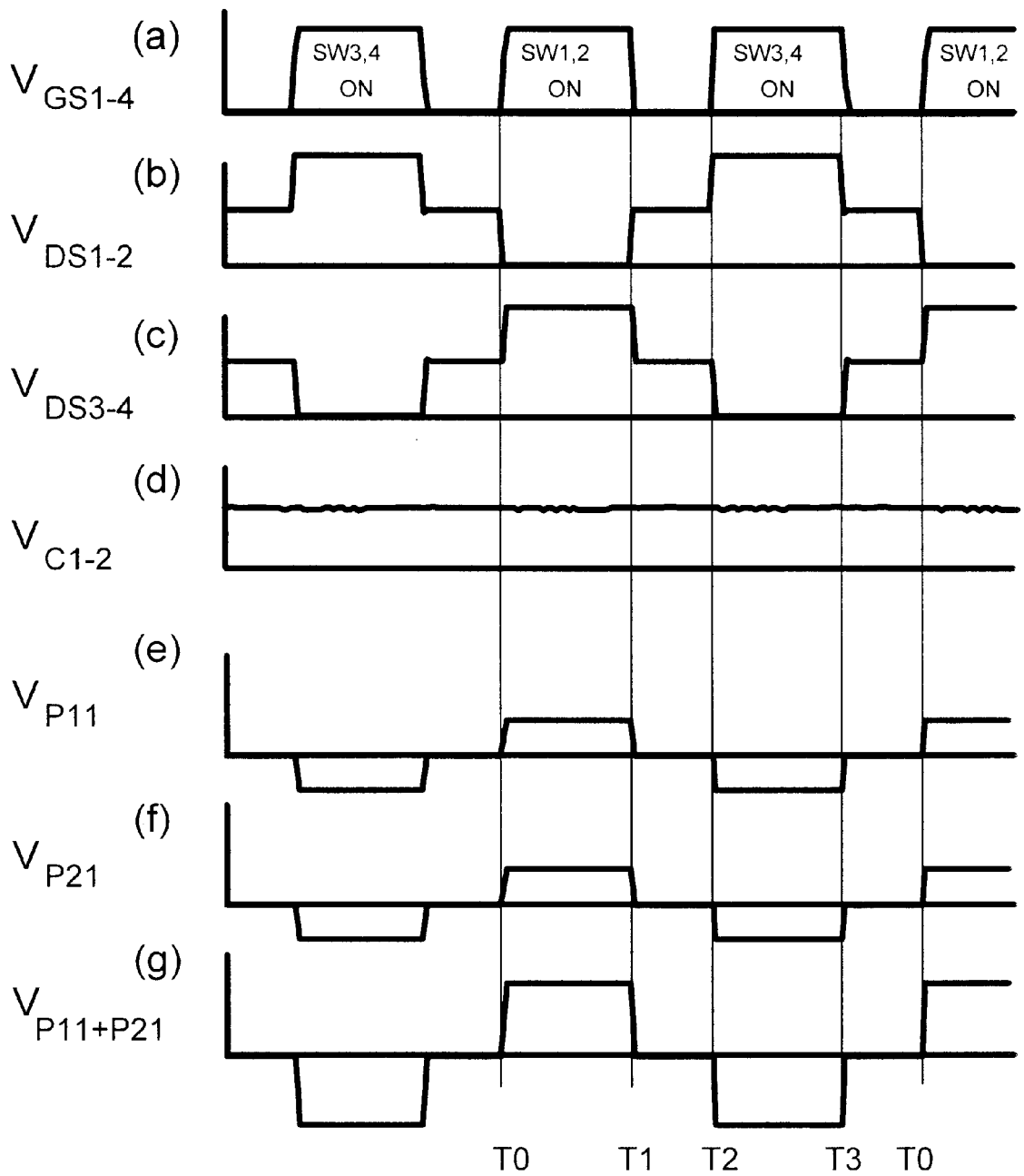
FIG. 4 illustrates voltage waveforms in double two-switch integrated filter forward converter of the invention.

Referring to FIGS. 3 and 4, two corresponding timing diagrams of a plurality of current and voltage waveforms are shown which are associated with primary and secondary windings of the converter of FIG. 2 when in steady state regulated operation. A voltage between a gate and a source of the MOSFETs SW1–SW4 is referred to as V(GS1)–V(GS4), respectively. A voltage between a drain and a source of the MOSFETs SW1–SW4 is referred to as VDS(l)–VDS(4) and a current thereof is referred to as I(SW1)–I(SW4), respectively. A voltage across the primary windings P11, P12, P21 and P22 is respectively expressed by V(P11), V(P12), V(P21) and V(P22). A voltage across the cross-coupled capacitors C1, C2 is referred to as V(C1), V(C2) and a current thereof is referred to as I(C1), I(C2). A current flowing from the input voltage source is referred to as I(in). Currents flowing through the rectifier D1 and D2 are referred to as I(D1) and I(D2), respectively. FIG. 3a illustrates a timing diagram of conduction time for the switch pairs SW1–SW2 and SW3–SW4. FIG. 3b illustrates, with respect to switch timing, the absolute value of the current waveform for the current flowing in the primary circuit that is the series connected circuit of SW1–SW2 and SW3–SW4. FIG. 3c illustrates the input current Iin with respect to switch timing. FIG. 3d illustrates the current flow in C1 and C2 with respect to switch timing. FIG. 3e illustrates the current flow in D1 with respect to switch timing. FIG. 3f illustrates the current flow in D2 with respect to switch timing. FIG. 3g illustrates the current flow in Lf, with respect to switch timing.

FIGS. 4b and 4C illustrate, with respect to switch timing, the voltage waveforms between a drain and a source of the MOSFETs SW1 through SW4. FIG. 4d illustrates the voltage across the cross-coupled capacitors C1 and C2 with respect to switch timing. FIG. 4e illustrates the voltage waveforms across primary windings P11 and P12 with respect to switch timing. FIG. 4f illustrates the voltage waveforms across primary windings P21 and P22 with respect to switch timing. FIG. 4g illustrates the summed voltage across P11–P21 or P12–P22, with respect to switch timing.

From FIG. 3a, the switch duty cycle is less than 50%, such that there is appreciable dead time, T1–T2 or T3–T0, between alternate switch pair conduction times. During the time interval T0–T1, power switches SW1 and SW2 are closed under command of PWM controller by signal line G1. The transformer polarities under these conditions are such that the dot ends of the windings are of positive polarity. In addition to a current loop of P11-SW1-SW2-P21 will be formed to transfer power to the load, two current loops C1-SW1-SW2-P21-P12 and C2-P22-P11-SW1-SW2 are formed to recover the energy from capacitors C1, C2 to the load. The voltages across the series connected parasitic capacitances of the MOSFETs, $Co_3$ and $Co_4$, increase to 2Vi and remain constant during this time interval. Also, the clamp diode, DV1, is turned on to ensure the voltage across $SW_3$ is limited to $V_{C1}$ and $V_{DS4}$=2Vi-$V_{DS3}$=2Vi-$V_{C1}$=2Vi-Vi=Vi.

The primary currents flowing in P11 and P12 are transformer coupled to secondary S1, which causes D1 to be forward biased and D2 to be reverse biased. This current flows through S1 and D1 to the load RL, with filter inductor Lf and capacitor Co smoothing any AC component (ripple). At the termination of this half cycle, as determined by PWM controller, SW1 and SW2 are switched OFF by signal line G1.

In the time interval T2–T3, power switches SW3 and SW4 are closed under command of PWM controller by signal line G2. The polarities across the primary windings reverse from the previous half cycle, and the dotted winding ends are now negative. A current loop of P22-SW4-SW3-P12 will be formed to transfer power to the load. Additionally, two current loops C2-SW4-SW3-P12-P21 and C1-P11-P22-SW4-SW3 are formed to recover the energy from capacitors C1, C2 to the load. Rectifier D1 is now reverse biased and D2 is forward biased, so current flow in S1 stops. Current flowing in P21 and P22 are now transformer coupled to cause current flow in S2 and D2, which results in current flow to the load, smoothed again by Lf and Co. The voltages across the series connected parasitic capacitances of the MOSFETs, $Co_1$ and $Co_2$, increase to 2Vi and remain constant during this time interval. Also, the clamp diode, $DV_2$, is turned on to ensure the voltage across $SW_2$ is limited to $V_{C2}$ and $V_{DS1}$=2Vi-$V_{DS2}$=2Vi-$V_{C2}$=2Vi-Vi=Vi. At the termination of this half cycle, as determined by PWM controller, SW3 and SW4 are switched OFF by signal line G2.

In the time intervals T1–T2 and T3–T0 are dead time periods. Dead time is a term of art that refers to the time between switch conduction intervals. During this time interval, primary current flows from primary windings of both transformers through C1 and C2 and thereof the cross-coupled capacitors C1, C2 will be charged by the voltage source Vi, as can be seen from FIG. 3d. However, the sum of the voltage of the primary windings P11–P12 as well as P21–P22 are all zero due to the polarities of these windings. Consequently, the leakage inductance and the cross-coupled capacitors C1, C2 form an LC filter, which induces a continuous input current waveform with a low current ripple and an instantaneous voltage equals to Vi to be presented across capacitors C1, C2. Meanwhile, the voltage between a drain and a source of the individual MOSFETs equals to half of the input voltage.

FIG. 4 illustrates voltage waveforms of the primary circuit of the invention of FIG. 2, FIGS. 4b and 4c illustrate the voltage across MOSFET SW1–SW4 with respect to switch timing. The voltage stress of each MOSFET in the series-connected switch pair is identical to each other due to the auto-sharing mechanism performed by turning-on the corresponding clamp diode. FIG. 4d illustrates the voltage across cross-coupled capacitors with respect to switch timing. FIG. 4e illustrates the voltage across P11–P12 with respect to switch timing. FIG. 4f illustrates the voltage across P21–P22 with respect to switch timing. FIG. 4g illustrates the summed voltage across P11 and P21 with respect to switch timing.

Referring to FIGS. 4e, 4f and 4g, when the SW1–SW2 switch pair is conducting, between T0 and T1, the summed voltage of the V(P11) and V(P21) equals Vi. Between T1 and T2, the primary is open. The rectifiers D1 and D2 are forward biased, so the reflected voltages to P11 and P21 are equal. However, the polarities are opposite, so the summed voltage of the V(P11) and V(P21) is zero. Thus, transformer discharges its magnetizing current through two output windings and rectifiers, to yield the output current sum as illustrated in FIG. 3g.

During the another half switching cycle, T2–T3 and T3–T0, the voltage waveforms can be described in the similar manner.

Figure 5A:
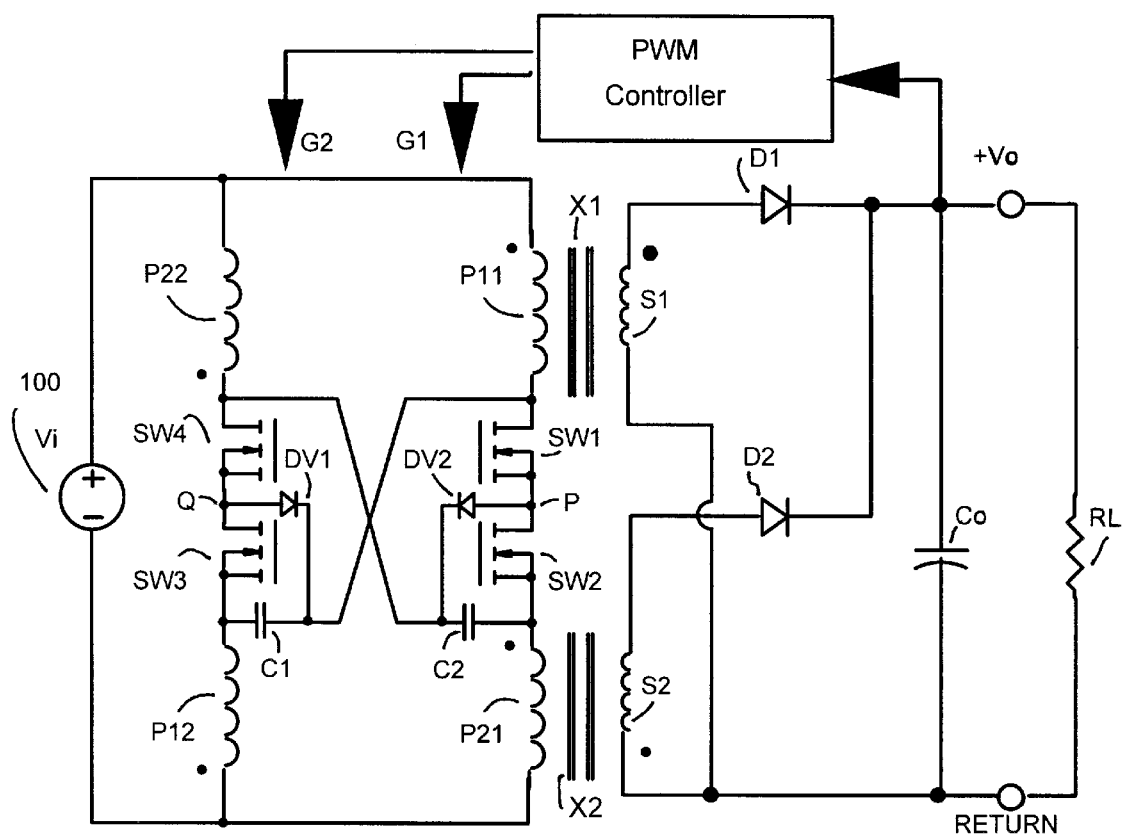
FIGS. 5A, 5B and 5C are circuit diagrams of three embodiments of the present invention that are implemented with two separate transformer structures.

Referring to FIG. 5A, a circuit diagram of another form of the invention, double two-switch integrated filter forward converter, is shown. The converter operates advantageously with a magnetically integrated structure combining transformer, input and output inductor functions. Two identical transformers are used instead of using a transformer and a filter inductor compared to FIG. 2. The converter includes a low impedance source of input voltage Vi (100) having a positive electrode and a negative electrode, two identical transformers X1 and X2. Two pairs of series-connected power switches SW1–SW2 and SW3–SW4, two clamp diodes DV1–DV2, and two cross-coupled capacitors C1–C2 being connected in the primary and two rectifying diodes D1–D2, a filter capacitor Co, and a load resistor RL being connected to the secondary winding of the transformers.

Each transformer has two primary windings and one secondary winding. Secondary winding S1 is wound on transformer X1, magnetically coupled to primary windings P11 and P12. Secondary winding S2 is wound on transformer X2, magnetically coupled to primary windings P21 and P22. Each winding has a first end and a second end. Again, the polarity of all windings is as shown by the conventional polarity dot notation. The second end of P22 winding and the first end of P11 winding being connected to the positive electrode of the voltage source Vi. The first end of P12 winding and the second end of P21 winding are connected to the negative electrode of the voltage source Vi. The cores of transformers X1 and X2 must be chosen or designed to be capable of transferring the desired output power and storing an amount of energy for proper operation with operating frequency of the converter.

Four power MOSFETs divide into two series-connected pairs. Each MOSFET has a gate receiving a control pulse from a pulse-width-modulation PWM controller. The first series-connected power switches SW1, SW2 connected between the second end of the P11 winding and the first end of the P21 winding and defining a first common point P between the MOSFETs SW1, SW2. The second series-connected power switches SW3, SW4 connected between the second end of P12 winding and the first end of the P22 winding and defining a second common point Q between the power switches SW3, SW4.

A first clamp diode DV1 connected between the second common point Q of the power switches SW3–SW4 and the second end of the P11 winding. A second clamp diode DV2 connected between the first common point P of the power switches SW1–SW2 and the first end of the P22 winding. A first cross-coupled capacitor C1 connected between the second ends of the P11–P12 windings, and a second cross-coupled capacitor C2 connected between the first ends of the P21–P22 windings. The second end of the S1 winding is connected to the first end of the S2 winding. Rectifier D1 is connected in series with secondary winding S1 for rectifying current flow in S1; and Rectifier D2 is connected in series with secondary winding S2 for rectifying current flow in S2. Converter output connection terminals +Vo and RETURN are available for connecting to the load to be powered by the converter; connection +Vo will be positive with respect to RETURN. The cathodes of D1 and D2 are connected together, and connected to terminal +Vo. The ends of S1 and S2 that are opposite their respective connections with D1 and D2 are connected to terminal RETURN. An output filter capacitor Co is connected across the terminals +Vo and RETURN. The converter delivers output power to a load shown at RL, which is connected across terminals +Vo and RETURN. By comparing the output voltage with a stable reference voltage, PWM controller issues output control signals G1 and G2 for opening and closing the power switches at a fixed operating frequency. The G1 and G2 signals are out of phase with each other to operate switches SW1 through SW4 in a pulse width modulation scheme. Signal G1 causes the switches SW1 and SW2 to close (switch ON) while switches SW3 and SW4 are open (switch OFF) by the appropriate command from G2. This causes the summed voltage across windings P11 and P21 to input voltage. For the other half cycle the roles are reversed; G2 commands SW3 and SW4 ON while G1 commands SW1 and SW2 OFF. This causes the summed voltage across windings P12 and P22 to input voltage.

Figure 6:
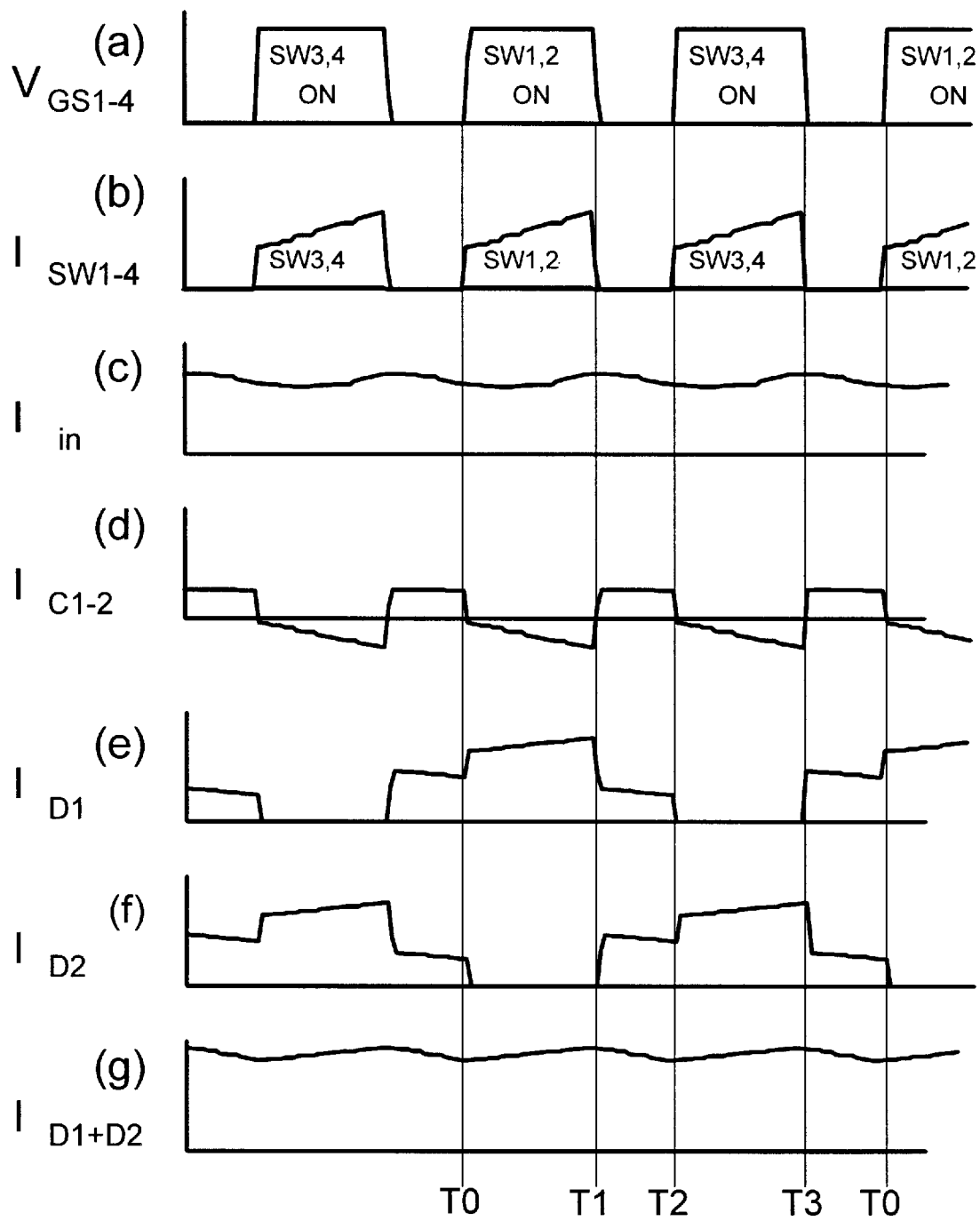
FIG. 6 illustrates current waveforms in double two-switch integrated filter forward converter of the invention.
Figure 7:
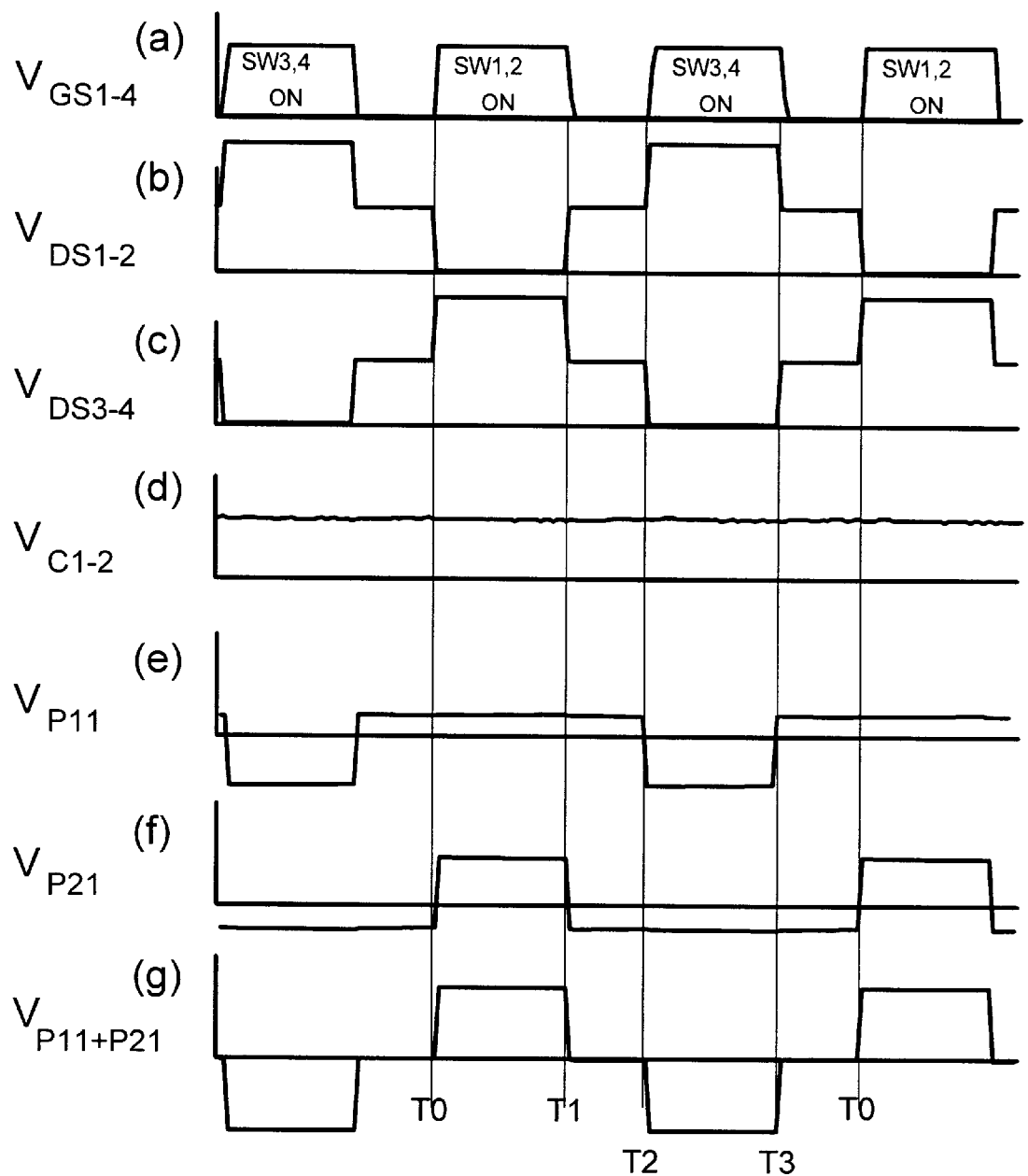
FIG. 7 illustrates voltage waveforms in double two-switch integrated filter forward converter of the invention.

Referring to FIGS. 6 and 7, two corresponding timing diagrams of a plurality of current and voltage waveforms are shown which are associated with primary and secondary windings of the converter of FIG. 5A when in steady state regulated operation. A voltage between a gate and a source of the MOSFETs SW1–SW4 is referred to as V(GS1)–V(GS4), respectively. A voltage between a drain and a source of the MOSFETs SW1–SW4 is referred to as VDS(1)–VDS(4) and a current thereof is referred to as I(SW1)–I(SW4), respectively. A voltage across the primary windings P11, P12, P21 and P22 is respectively expressed by V(P11), V(P12), V(P21) and V(P22). A voltage across the cross-coupled capacitors C1, C2 is referred to as V(C1), V(C2) and a current thereof is referred to as I(C1), I(C2). A current flowing from the input voltage source is referred to as I(in). Currents flowing through the rectifier D1 and D2 are referred to as I(D1) and I(D2), respectively.

FIG. 6a illustrates a timing diagram of conduction time for the switch pairs SW1–SW2 and SW3–SW4. FIG. 6b illustrates, with respect to switch timing, the absolute value of the current waveform for the current flowing in the primary circuit that is the series connected circuit of SW1–SW2 and SW3–SW4. FIG. 6c illustrates the input current Iin with respect to switch timing. FIG. 6d illustrates the current flow in C1 and C2 with respect to switch timing. FIG. 6e illustrates the current flow in D1 with respect to switch timing. FIG. 6f illustrates the current flow in D2 with respect to switch timing. FIG. 6g illustrates the sum of the D1 and D2 currents into Co, with respect to switch timing.

FIGS. 7b and 7C illustrate, with respect to switch timing, the voltage waveforms between a drain and a source of the MOSFETs SW1 through SW4. FIG. 7d illustrates the voltage across the cross-coupled capacitors C1 and C2 with respect to switch timing. FIG. 7e illustrates the voltage waveforms across primary windings P11 and P12 with respect to switch timing. FIG. 7f illustrates the voltage waveforms across primary windings P21 and P22 with respect to switch timing. FIG. 7g illustrates the summed voltage across P11–P21 or P12–P22, with respect to switch timing.

From FIG. 6a, the switch duty cycle is less than 50%, such that there is appreciable dead time, T1–T2 or T3–T0, between alternate switch pair conduction times. During the time interval T0–T1, power switches SW1 and SW2 are closed under command of PWM controller by signal line G1. The transformer polarities under these conditions are such that the dot ends of the windings are of positive polarity. In addition to a current loop of P11-SW1-SW2-P21 will be formed to transfer power to the load, two current loops C1-SW1-SW2-P21-P12 and C2-P22-P11-SW1-SW2 are formed to recover the energy from capacitors C1, C2 to the load. The voltages across the series connected parasitic capacitances of the MOSFETs, $Co_3$ and $Co_4$, increase to 2Vi and remain constant during this time interval. Also, the clamp diode, $Dv_1$, is turned on to ensure the voltage across $SW_3$ is limited to $V_{C1}$ and $V_{DS4}=2Vi-V_{DS3}=2Vi-V_{C1}=2Vi-Vi=Vi$.

The primary currents flowing in P11 and P12 are transformer coupled to secondary S1, which causes D1 to be forward biased and D2 to be reverse biased. Thus, X1 is a transformer to transfer power to the load. This current flows through S1 and D1 to the load RL, with capacitor Co smoothing any AC component (ripple). Since D2 is reverse biased, X2 is acting as a series inductance and the P21 and P22 currents must be supported by magnetizing flux in the core of X2. At the termination of this half cycle, as determined by controller, SW1 and SW2 are switched OFF by signal line G1.

In the time interval T2–T3, power switches SW3 and SW4 are closed under command of controller by signal line G2. The polarities across the primary windings reverse from the previous half cycle, and the dotted winding ends are now negative. A current loop of P22-SW4-SW3-P12 will be formed to transfer power to the load. Additionally, two current loops C2-SW4-SW3-P12-P21 and C1-P11-P22-SW4-SW3 are formed to recover the energy from capacitors C1, C2 to the load. Rectifier D1 is now reverse biased and D2 is forward biased, so current flow in S1 stops. Current flowing in P21 and P22 are now transformer coupled to cause current flow in S2 and D2, which results in current flow to the load, smoothed again by Co. Since D1 is reverse biased, P11 and P12 currents must be supported by flux in the X1 core. This causes a flux increase in X1, resulting in an increase in stored X1 flux energy. The voltages across the series connected parasitic capacitances of the MOSFETs, $Co_1$ and $Co_2$, increase to 2Vi and remain constant during this time interval. Also, the clamp diode, $DV_2$, is turned on to ensure the voltage across $SW_2$ is limited to $V_{C2}$ and $V_{DS1}=2Vi-V_{DS2}=2Vi-V_{C2}=2Vi-Vi=Vi$. At the termination of this half cycle, as determined by PWM controller, SW3 and SW4 are switched OFF by signal line G2.

In the time intervals T1–T2 and T3–T0 are dead time periods. Dead time is a term of art that refers to the time between switch conduction intervals. During this time interval, primary current flows from primary windings of both transformers through C1 and C2 and thereof the cross-coupled capacitors C1, C2 will be charged by the voltage source Vi, as can be seen from FIG. 6d. However, the sum of the voltage of the primary windings P11–P12 as well as P21–P22 are all zero due to the polarities of these windings. Consequently, the leakage inductance and the cross-coupled capacitors C1, C2 form an LC filter, which induces a continuous input current waveform with a low current ripple and an instantaneous voltage equals to Vi to be presented across capacitors C1, C2. Meanwhile, the voltage between a drain and a source of the MOSFETs equals to half of the input voltage each.

FIG. 7 illustrates voltage waveforms of the primary circuit of the invention of FIG. 5A, FIGS. 7b and 7c illustrate the voltage across MOSFET SW1 through SW4 with respect to switch timing. The voltage stress of each MOSFET in the series-connected switch pair is identical to each other due to the auto-sharing mechanism performed by turning-on the corresponding clamp diode. FIG. 7d illustrates the voltage across cross-coupled capacitors with respect to switch timing. FIG. 7e illustrates the voltage across P11–P12 in X1 with respect to switch timing. FIG. 7f illustrates the voltage across P21–P22 in X2 with respect to switch timing. FIG. 7g illustrates the summed voltage across P11 and P21 with respect to switch timing.

Referring to FIGS. 7e, 7f and 7g, when the SW1–SW2 switch pair is conducting, between T0 and T1, the summed voltage of the V(P11) and V(P21) equals Vi. Between T1 and T2, the primary is open. Both X1 and X2 forward bias their respective output rectifiers, so the reflected voltages to P11 and P21 are equal. However, the polarities are opposite, so the summed voltage of the V(P11) and V(P21) is zero. Thus, both transformers discharge their magnetizing current through their respective output winding and rectifier, to yield the output current sum as illustrated in FIG. 6g.

During the another half switching cycle, T2–T3 and T3–T0, the voltage waveforms can be described in the similar manner.

Figure 5B:
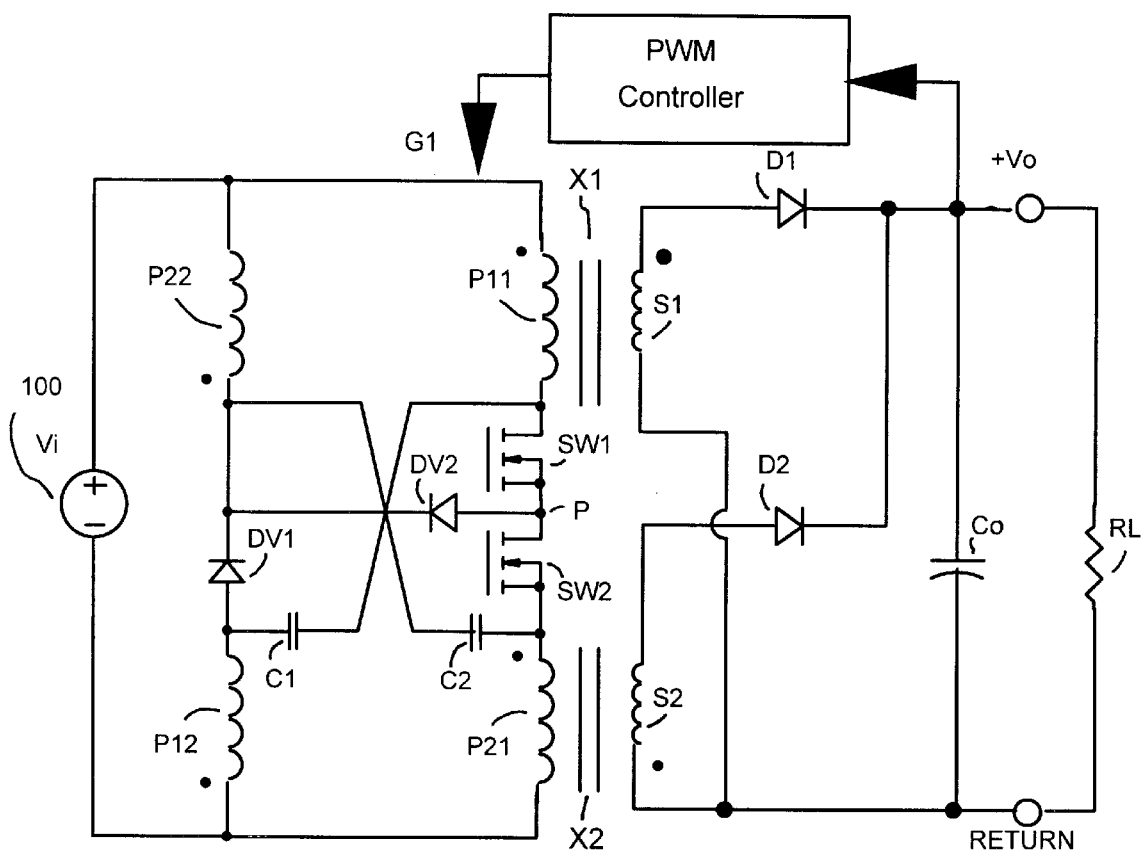

Referring to FIG. 5B, a circuit diagram of another form of the invention, two-switch integrated filter forward converter, is shown. Again, the converter operates advantageously with a magnetically integrated structure combining transformer, input and output inductor functions. The converter includes a low impedance source of input voltage Vi (100) having a positive electrode and a negative electrode, two identical transformers X1 and X2 Two series-connected power switches SW1–SW2, two clamp diodes DV1–DV2, and two cross-coupled capacitors C1–C2 being connected in the primary and two rectifying diodes D1–D2, a filter capacitor Co, and a load resistor RL being connected to the secondary winding of the transformers.

Each transformer has two primary windings and one secondary winding. Secondary winding S1 is wound on transformer X1, magnetically coupled to primary windings P11 and P12. Secondary winding S2 is wound on transformer X2, magnetically coupled to primary windings P21 and P22. Each winding has a first end and a second end. The polarity of all windings is as shown by the conventional polarity dot notation. The second end of P22 winding and the first end of P11 winding being connected to the positive electrode of the voltage source Vi. The first end of P12 winding and the second end of P21 winding are connected to the negative electrode of the voltage source Vi. The cores of transformers X1 and X2 must be chosen or designed to be capable of transferring the desired output power and storing an amount of energy for proper operation with operating frequency of the converter.

Two series-connected MOSFETs, SW1–SW2, have a gate receiving a control pulse from a PWM controller and being connected between the second end of the P11 winding and the first end of the P21 winding and defining a common point P between the MOSFETs SW1, SW2.

A first clamp diode DV1 connected between the second end of P12 winding and the first end of the P22 winding. A second clamp diode DV2 connected between the common point P of the power switches SW1–SW2 and the first end of the P22 winding. A first cross-coupled capacitor C1 connected between the second ends of the P11 and P12 windings, and a second cross-coupled capacitor C2 connected between the first ends of the P21 and P22 windings. The second end of the S1 winding is connected to the first end of the S2 winding. Rectifier D1 is connected in series with secondary winding S1 for rectifying current flow in S1; and Rectifier D2 is connected in series with secondary winding S2 for rectifying current flow in S2. Converter output connection terminals +Vo and RETURN are available for connecting to the load to be powered by the converter; connection +Vo will be positive with respect to RETURN. The cathodes of D1 and D2 are connected together, and connected to terminal +Vo. The ends of S1 and S2 that are opposite their respective connections with D1 and D2 are connected to terminal RETURN. An output filter capacitor Co is connected across the terminals +Vo and RETURN. The converter delivers output power to a load shown at RL, which is connected across terminals +Vo and RETURN.

By comparing the output voltage with a stable reference voltage, PWM controller issues output control signal G1 for opening and closing the power switches at a fixed operating frequency. Signal G1 causes the switches SW1 and SW2 to close (switch ON) . This causes the summed voltage across windings P11 and P21 to input voltage.

Figure 8:
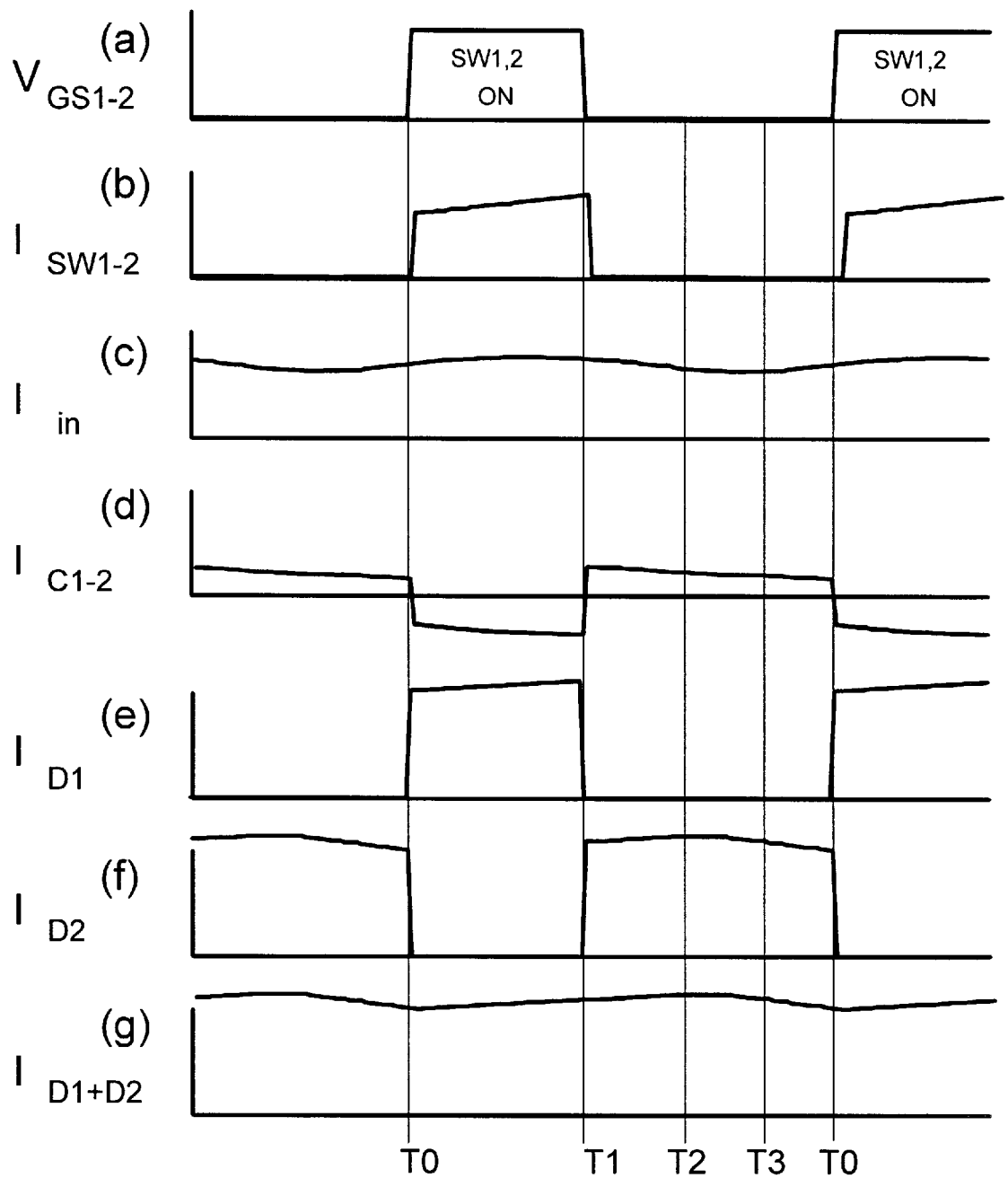
FIG. 8 illustrates current waveforms in two-switch integrated filter forward converter of the invention.
Figure 9:
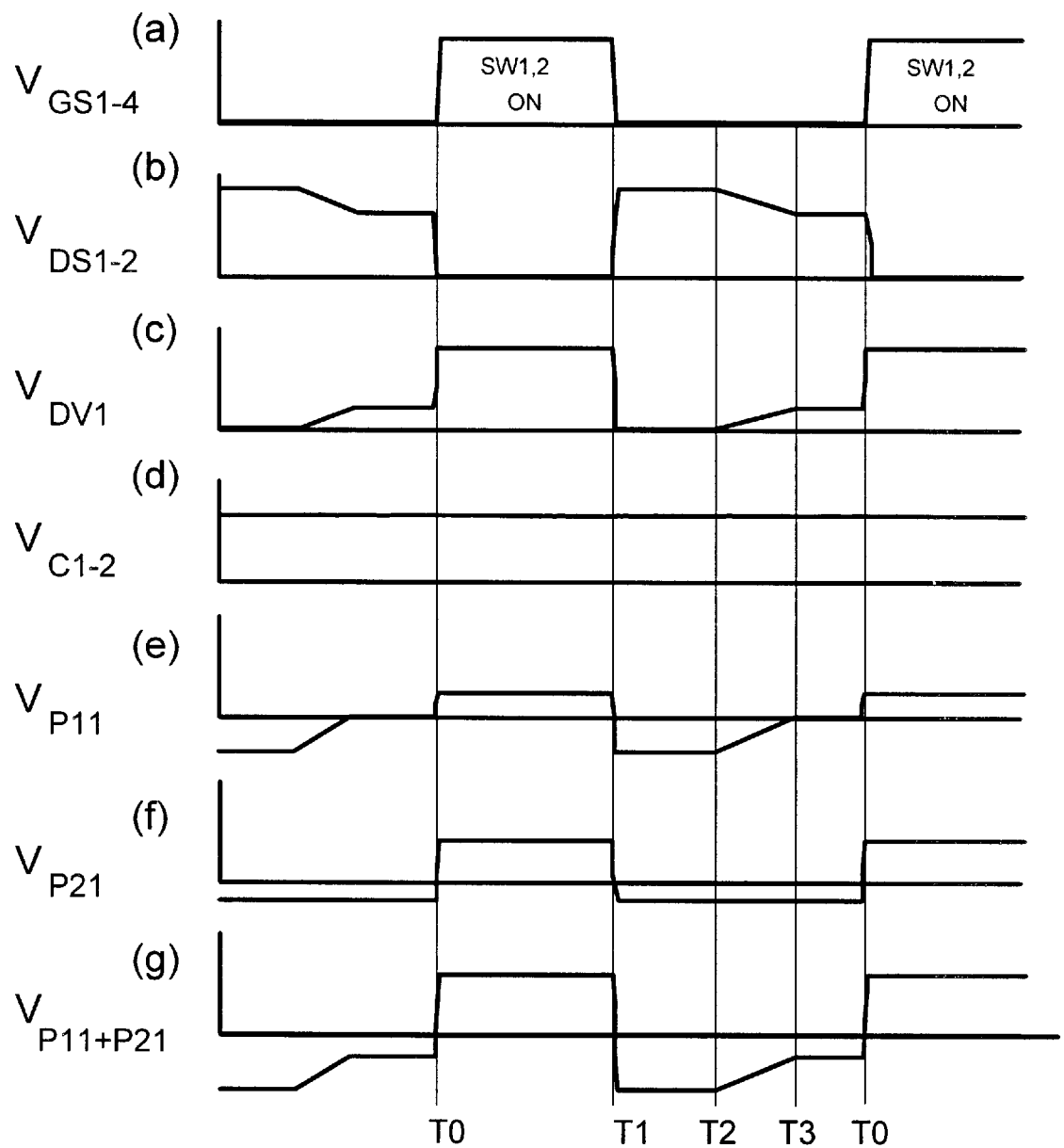
FIG. 9 illustrates voltage waveforms in two-switch integrated filter forward converter of the invention.

Referring to FIGS. 8 and 9, two corresponding timing diagrams of a plurality of current and voltage waveforms are shown which are associated with primary and secondary windings of the converter of FIG. 5B when in steady state regulated operation. A voltage between a gate and a source of the MOSFETs SW1–SW2 is referred to as V(GS1)–V (GS2), respectively. A voltage between a drain and a source of the MOSFETs SW1–SW2 is referred to as VDS(1)–VDS (2) and a current thereof is referred to as I(SW1)–I(SW2), respectively. A voltage across the primary windings P11, P12, P21 and P22 is respectively expressed by V(P11), V(P12), V(P21) and V(P22). A voltage across the cross-coupled capacitors C1 and C2 is referred to as V(C1), V(C2) and a current thereof is referred to as I(C1), I(C2). A current flowing from the input voltage source is referred to as I(in). Currents flowing through the rectifier D1 and D2 are referred to as I(D1) and I(D2), respectively.

FIG. 8a illustrates a timing diagram of conduction time for the switch pairs SW1–SW2. FIG. 8b illustrates, with respect to switch timing, the absolute value of the current waveform for the current flowing in the primary circuit that is the series connected circuit of SW1–SW2. FIG. 8c illustrates the input current Iin with respect to switch timing. FIG. 8d illustrates the current flow in C1 and C2 with respect to switch timing. FIG. 8e illustrates the current flow in D1 with respect to switch timing. FIG. 8f illustrates the current flow in D2 with respect to switch timing. FIG. 8g illustrates the sum of the D1 and D2 currents into Co, with respect to switch timing.

FIG. 9 illustrates voltage waveforms of the primary circuit of the invention of FIG. 5B, operated as described to give the current waveforms of FIG. 8. FIG. 9a illustrates a timing diagram of conduction time for the switch pairs SW1–SW2. FIG. 9b illustrates, with respect to switch timing, a voltage waveform between a drain and a source of a MOSFET that is the series connected of SW1–SW2. FIG. 9c illustrates, with respect to switch timing, the voltage waveform across the clamp diode Dv1. FIG. 9d illustrates the voltage across the cross-coupled capacitors C1 and C2 with respect to switch timing. FIG. 9e illustrates the voltage waveforms across primary windings P11 and P12 with respect to switch timing. FIG. 9f illustrates the voltage waveforms across primary windings P21 and P22 with respect to switch timing. FIG. 9g illustrates the sum of voltage across P11–P21 or P12–P22, with respect to switch timing. During the time interval T0–T1, power switches SW1 and SW2 are closed under command of PWM controller by signal line G1. The transformer polarities under these conditions are such that the dot ends of the windings are of positive polarity. The primary currents flowing in P11 and P12 are transformer coupled to secondary S1, which causes D1 to be forward biased and D2 to be reverse biased. Thus, X1 is a transformer to transfer power to the load. This current flows through S1 and D1 to the load RL, with capacitor Co smoothing any AC component (ripple). Since D2 is reverse biased, X2 is acting as a series inductance and the P21 and P22 currents must be supported by magnetizing flux in the core of X2.

In addition to a current loop of P11-SW1-SW2-P21 will be formed to transfer power to the load, two current loops C1-SW1-SW2-P21-P12 and C2-P22-P11-SW1-SW2 are formed to recover the leakage energy from capacitors C1, C2 to the load. The voltages across the parasitic capacitances of the clamp diode, DV1, increase to 2Vi and remain constant during this time interval. At time T1, as determined by controller, SW1 and SW2 are switched OFF by signal line G1.

During T1–T2 time interval period, the polarities across the primary windings reverse from the previous half cycle, and the dotted winding ends are now negative. Referring to FIG. 9b, the voltages across the series connected parasitic capacitances of the MOSFETs, $Co_1$ and $Co_2$, increase to 2Vi at T1. Also, the clamp diode, $DV_2$, is turned on to ensure the voltage across $SW_2$ is limited to $V_{C2}$ and $V_{DS1}=2V_i-V_{DS2}=2V_i-V_{C2}=2V_i-V_i=V_i$. Rectifier D1 is now reverse biased and D2 is forward biased, so current flow in S1 stops. Current flowing in P21 and P22 are now transformer coupled to cause current flow in S2 and D2, which results in current flow to the load, smoothed again by Co. The primary current flows from primary windings of both transformers through C1 and C2 and thereof the cross-coupled capacitors C1, C2 will be charged by the voltage source Vi through $P_{11}$-$C_1$-$P_{12}$ and $P_{22}$-$C_2$-$P_{21}$, respectively, as can be seen from FIG. 8d. However, the sum of the voltage of the primary windings P11–P12 as well as P21–P22 are all zero due to the polarities of these windings. Consequently, the leakage inductance and the cross-coupled capacitors C1, C2 form an LC filter, which induces a continuous input current waveform with a low current ripple and an instantaneous voltage equals to Vi to be presented across capacitors C1, C2.

During T2–T0 time period, the polarity across the non-conducting transformer primary windings maintain negative. Thus, X2 transformer still forward biases D2 and flow magnetizing current to provide a load current into C1 to yield the continuous output current as illustrated in FIG. 8f. Referring to FIG. 8g, a continuous output urrent is thus maintained whole the switching period, despite varying pulse widths. At $T_0$, $SW_1$ and $SW_2$ are turned on simultaneously again, starting another switching cycle.

Figure 5C:
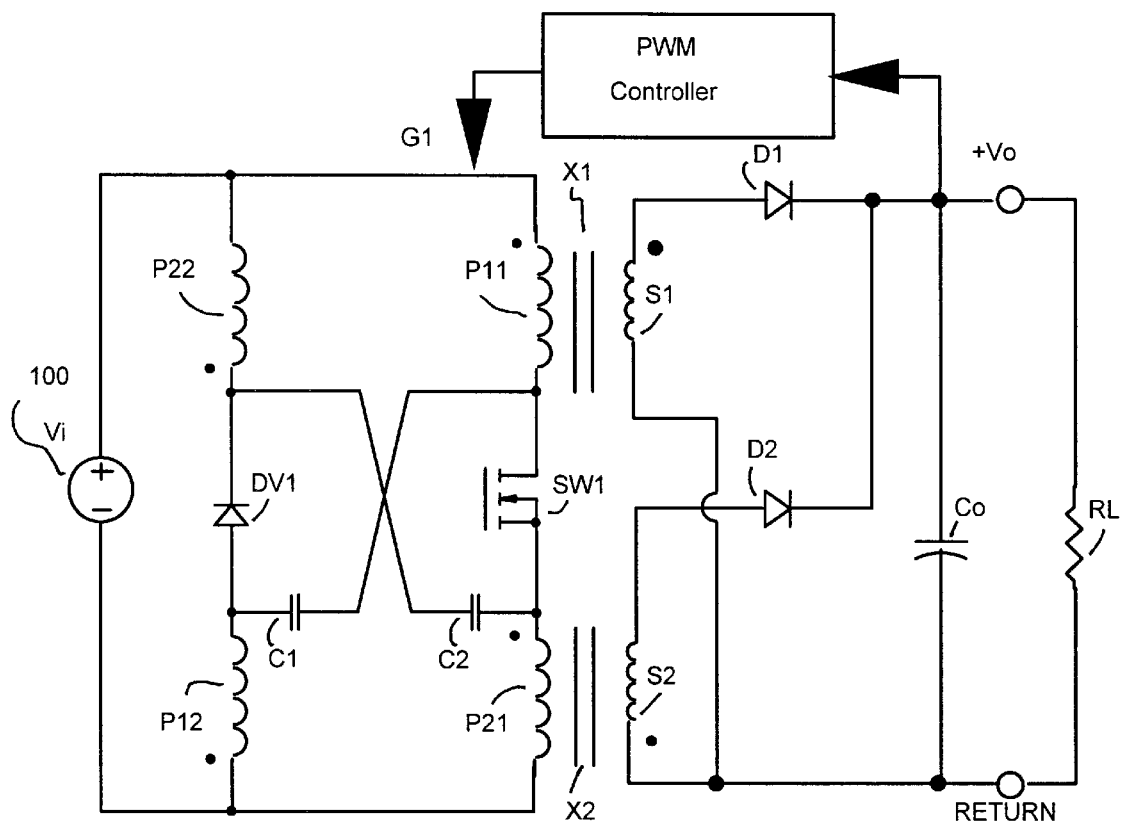

Referring to FIG. 5C, a circuit diagram of another form of the invention, single-switch integrated filter forward converter, is shown. The embodiment of FIG. 5C is very similar to the embodiment of FIG. 5B in operation, but employs a main power switch and a clamp diode instead of using two power switches and clamp diodes in the embodiment of FIG. 5B.

From the foregoing description, and especially with reference to the current waveforms illustrated in FIGS. 4c, 4g, 6c, 6g, 8c and 8g, a very advantageous aspect of the operation of the present invention becomes clear. Both the input and output currents of the converters yield continuous current operation. Referring to FIG. 2, energy required for input filtering is stored magnetically and provided to the input as required due to an inherent function of transformer operation with no supplemental series input filter inductor. Thus, the magnetic of the double two-switch integrated filter forward converter functionally integrates the transformer and input filter inductor. Referring to FIGS. 5A, 5B and 5C, energy required for input and output filtering is stored magnetically and provided to the input and output as required due to an inherent function of transformer operation with no supplemental series input and output filter inductors. Thus, the magnetics of the present invention functionally integrate the transformer, input and output filter inductors.

Figure 10A:
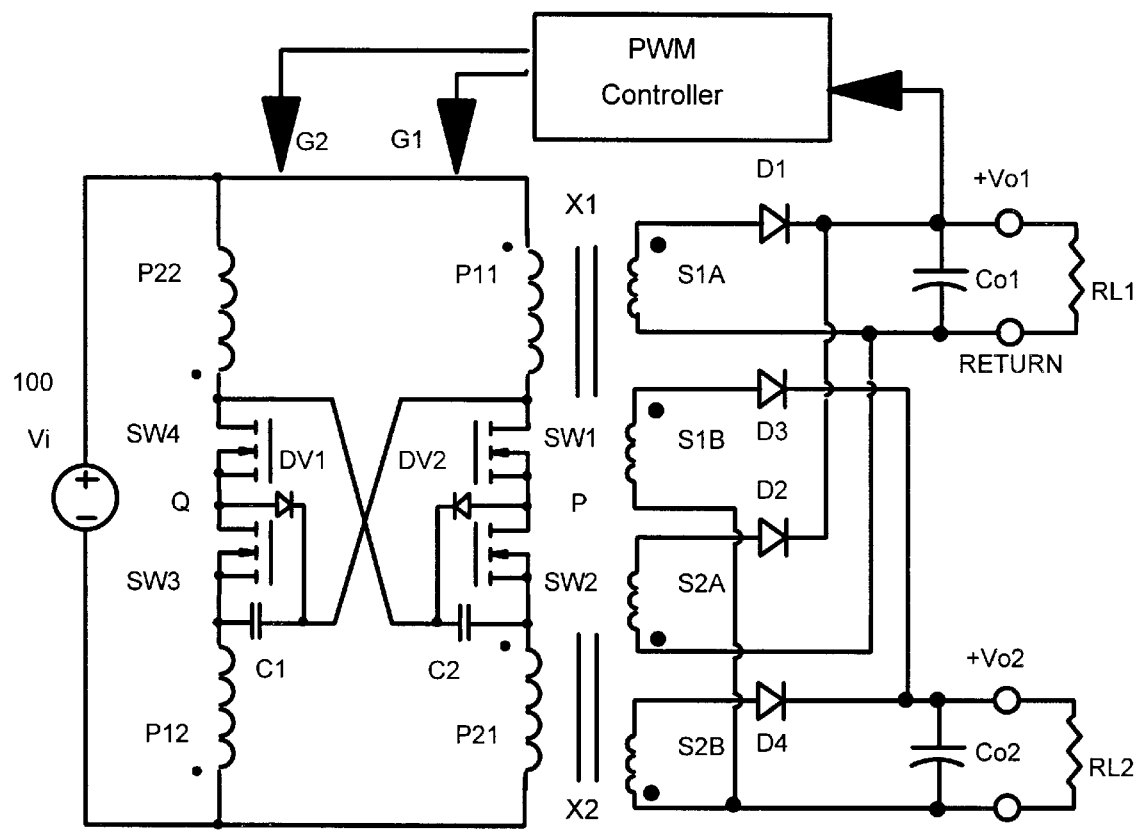
FIGS. 10A, 10B and 10C are three embodiments of the present invention that have multiple outputs implemented using auxiliary secondary circuits.
Figure 10B:
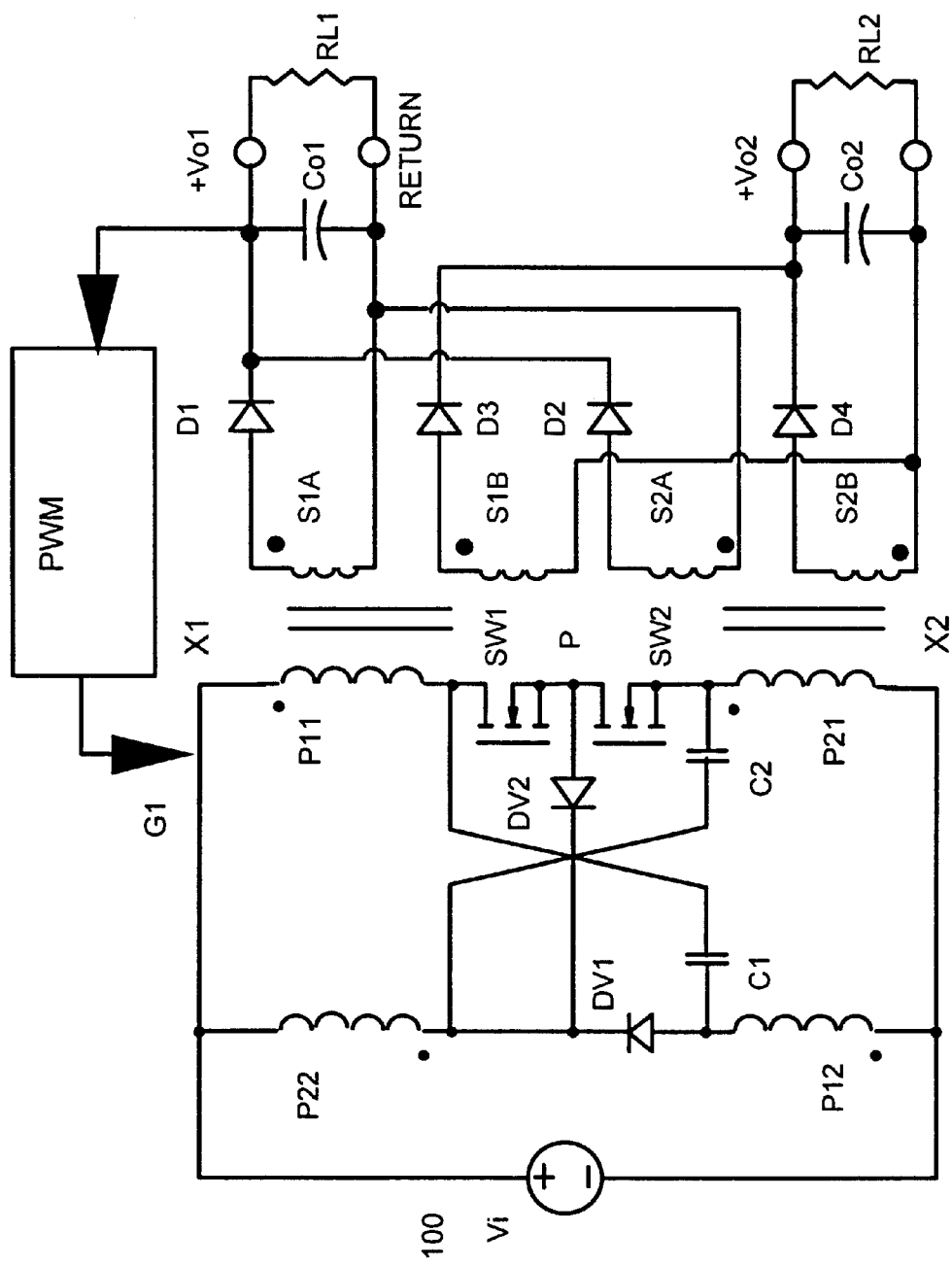
Figure 10C:
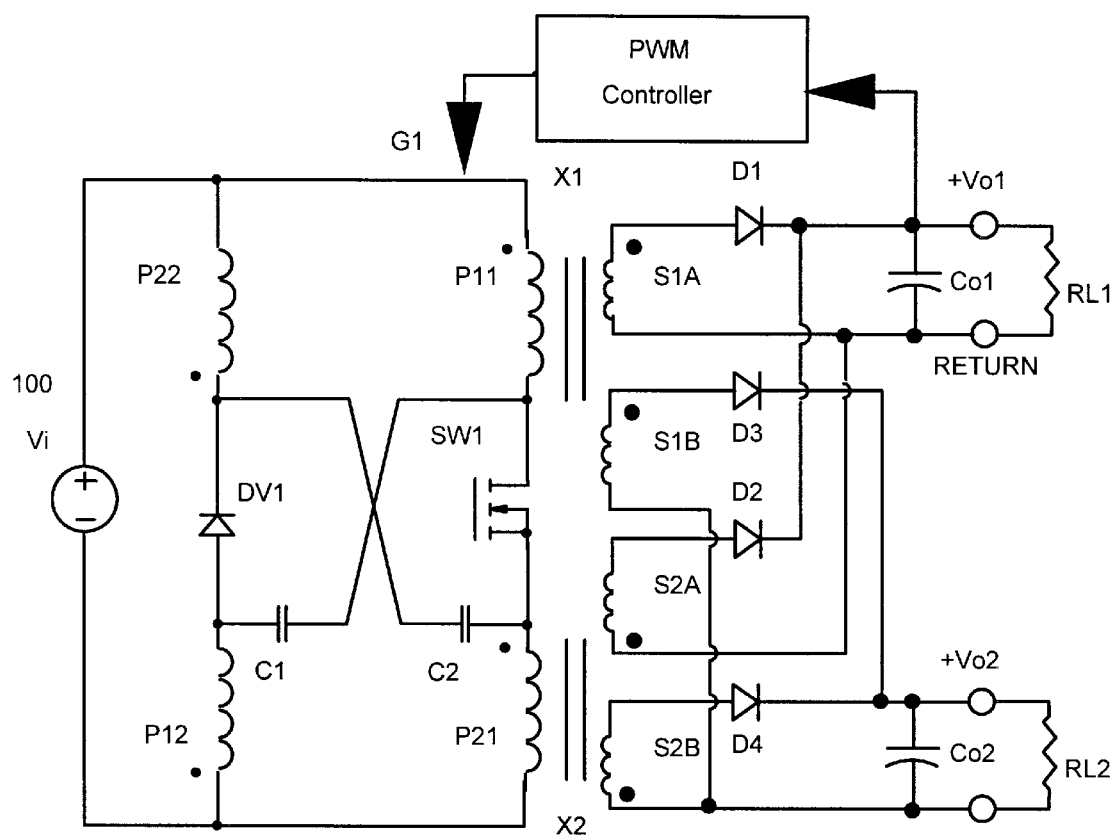

Referring now to FIGS. 10A, 10B and 10C, three multiple output embodiments of the invention are illustrated. In FIGS. 10A, 10B and 10C, primaries are configured the same way as for the converters of FIGS. 5A, 5B and 5C, respectively. Transformer X1 has primary windings P11–P12 and secondaries S1A-S1B. Transformer X2 has primary windings P21–P22 and secondaries S2A-S2B. Windings S1A and S2A are rectified by rectifiers D1 and D2 respectively. Windings S1B and S2B are rectified by rectifiers D3 and D4, respectively. Output terminal +Vo1 receives current from D1 and D2, and is filtered by output smoothing capacitor Co1. Output terminal +Vo2 receives current from D3 and D4, and is filtered by output smoothing capacitor Co2. The inventions of FIGS. 10A, 10B and 10C operate just as for that of FIGS. 5A, 5B and 5C, except that the stored flux in X1 and X2 must now be divided to supply the output currents for +Vo1 and +Vo2. The current waveforms through the output rectifiers D1–D2 and D3–D4 in continuous conduction are just as for rectifiers D1 and D2 of FIGS. 5A, 5B and 5C under the same circumstances. Thus, the magnetizing currents from the transformers merely divide to supply the current required from each output. Thus, the windings operate effectively in parallel, but each according to the principles as described for the embodiment of FIGS. 5A, 5B and 5C. The pulse width modul ation feedback loop may be closed around only one of the outputs, if desired, since the other output will track due to transformer coupling with respect to the number of turns on secondary windings. Thus, the output voltage of auxiliary secondaries will be the secondary turns ratio of the auxiliary to the winding around which the loop is closed, as is the case for multiple outputs on the well-known flyback converter.

Figure 11:
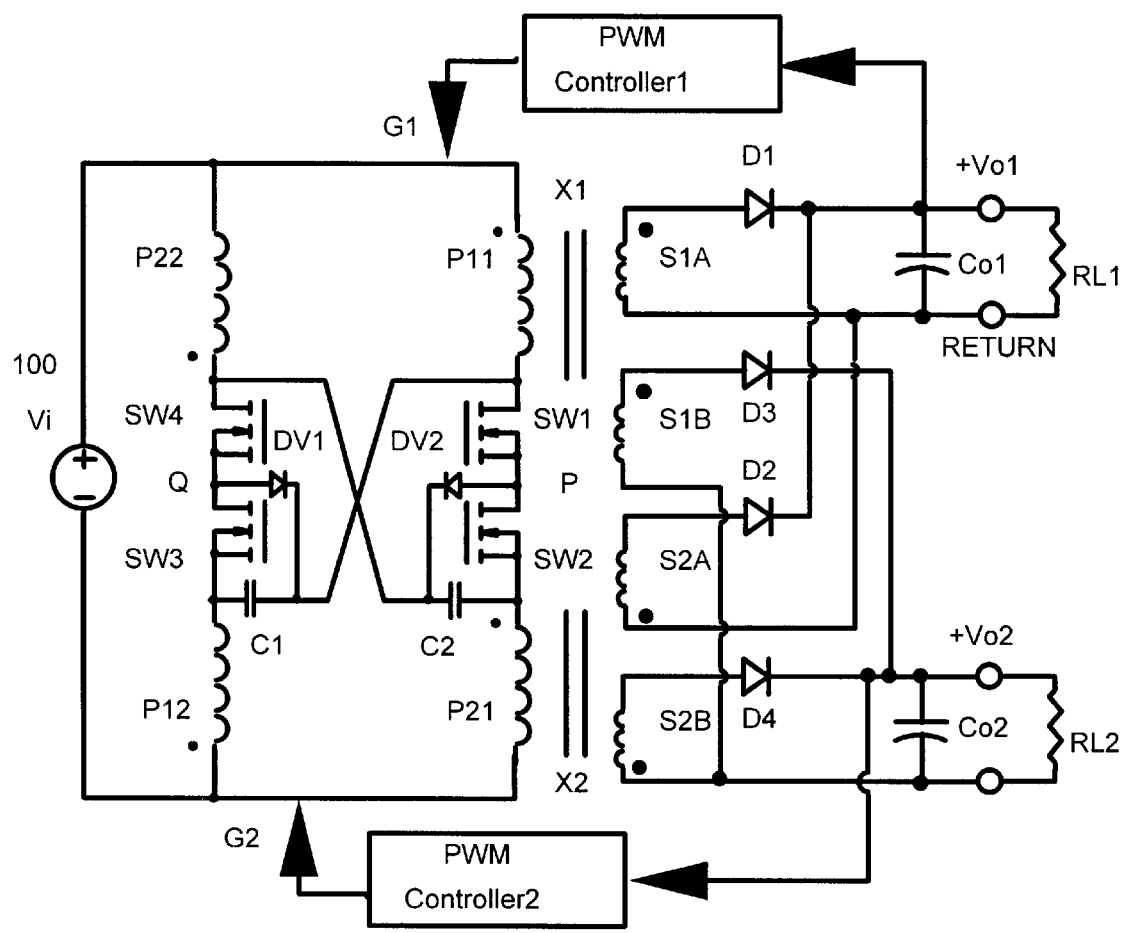
FIG. 11 illustrates an embodiment of the present invention, double two-switch integrated filter forward converter, which has two fully regulated outputs implemented using two separate pulse-width-modulation controllers.

Referring now to FIG. 11, a multiple output embodiment of the invention is illustrated. In FIG. 11, both primaries and secondaries are configured the same way and operate as for the converters of FIG. 10A except those two separate PWM controllers now are used to regulate the two output voltages independently. Two pulse width modulation feedback loops are closed around two separate outputs, +Vo1 and +Vo2. Thus, at least two of the multiple output voltages can be fully regulated to meet the tight regulation specification, if required.

The embodiments of FIGS. 5A, 5B and 5C provide advantageous operation by virtue of integrating the function of the transformer and filter inductor into the same magnetic circuit with two physically independent transformers. It is, however, possible to combine multiple magnetic functions into a single magnetic assembly by employing integrated magnetic techniques. Information on the design of converters using integrated magnetics technique can be found in a text by Rudolf P. Severns and Gordon E. Bloom, titled "Modern DC-To-DC Switchmode Power Converter Circuits" (Van Nostrand Reinhold Company, 1985). Thus, even simpler and more compact embodiments of the converter of the present invention can be realized with other magnetic construction.

Figure 12A:
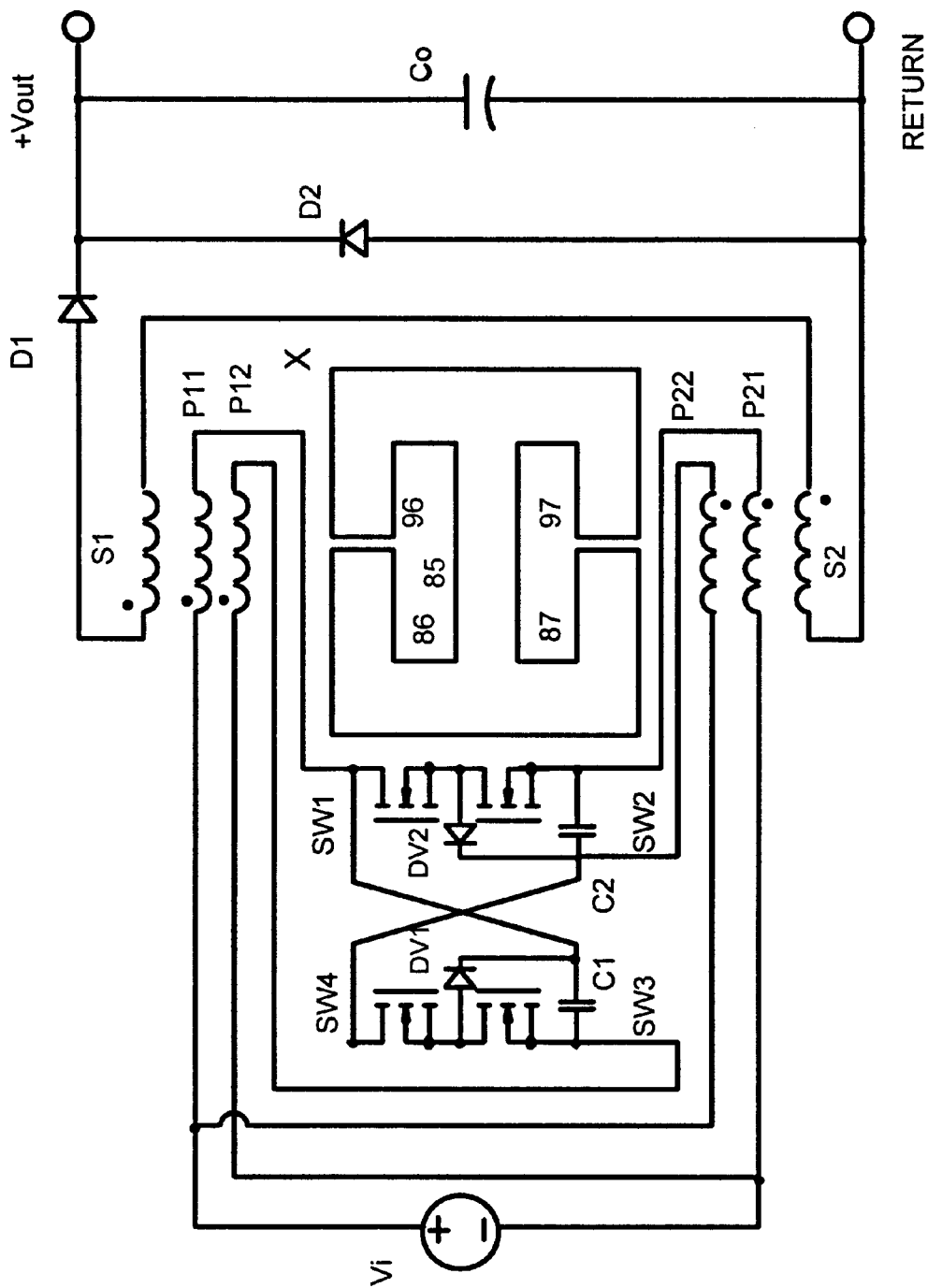
FIGS. 12A and 12B are semi-schematic diagrams of two alternative embodiments of the invention that are implemented to double two-switch integrated filter forward converter in two different integrated magnetic E-core structures.
Figure 12B:
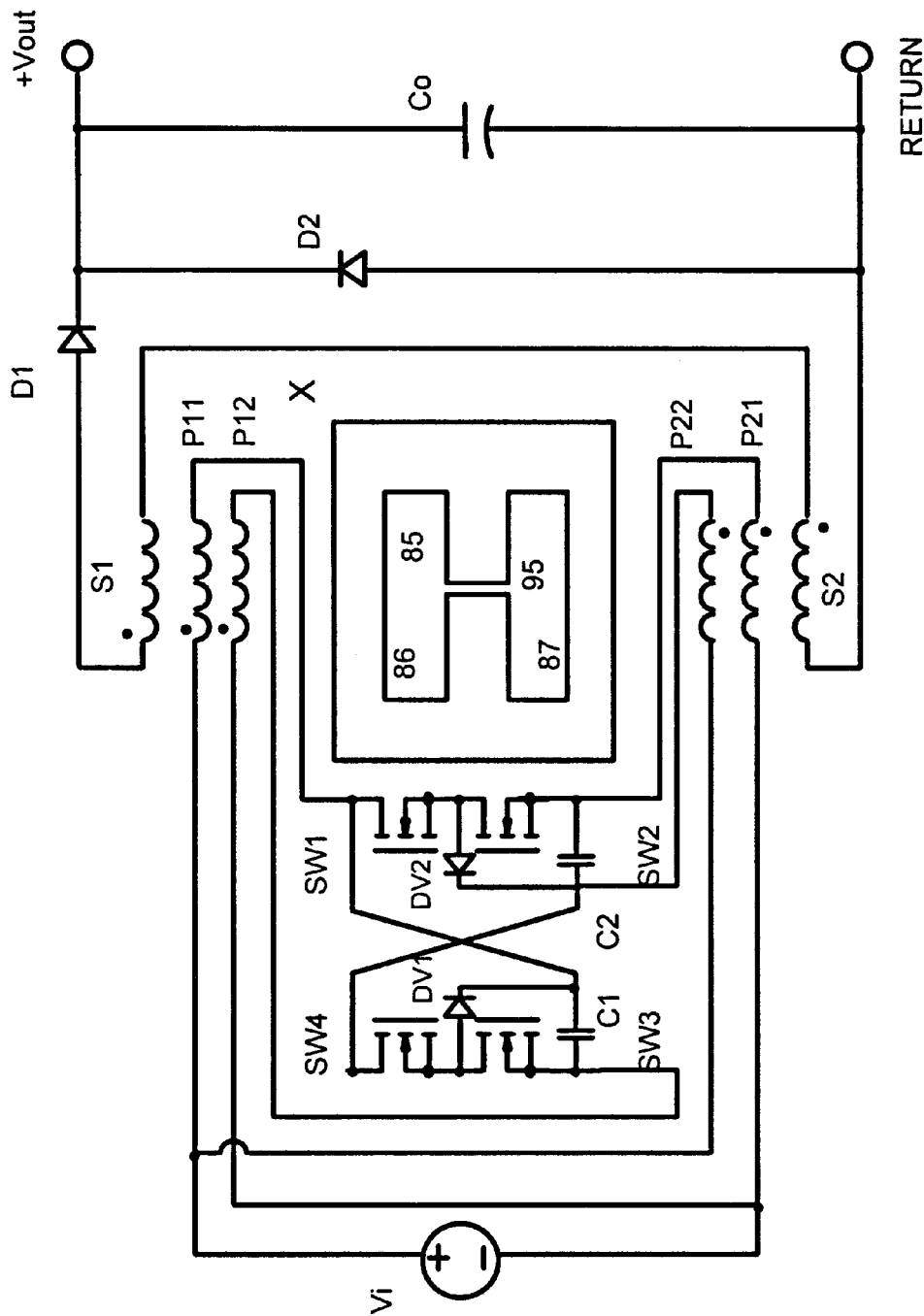

FIG. 12A and 12B illustrate two integrated magnetic constructions of the invention wherein the two transformers are implemented in a magnetic construction wherein flux paths are shared. In FIG. 12A, a voltage source 100 provides voltage to a double two-switch integrated filter forward converter consisting of switching elements SW1, SW2, SW3, and SW4, which operate in pairs under control of a pulse width modulation control circuit, as was described for the embodiment of FIG. 5A. A three-leg magnetic circuit is implemented in a ferrite core transformer, generally indicated at X. Transformer X has center core leg 85, and outer core legs 86 and 87. Core leg 86 has gap 96, and core leg 87 has gap 97. Gaps 96 and 97 are designed such that sufficient energy is stored. Further, the gaps should be essentially equal such that the reluctance of the magnetic paths of legs 96 and 97 are essentially equal. Primary windings P11–P12 are wound on leg 86, and primary windings P21–P22 are wound on leg 87. Secondary winding S1 is wound on leg 86 and coupled to primaries P11 and P12. Secondary winding S2 is wound on leg 87 and coupled to primaries P21 and P22. Diode D1 rectifies the output of winding S1, and diode D2 rectifies the output of winding S2. Phasing of the windings is as shown by the phase dots. The diodes D1 and D2 provide current to supply a load via output terminals +Vo and RETURN. Capacitor Co is connected across +Vo and RETURN, and acts to filter ripple and smooth the output at +Vo. The current and voltage waveforms of FIG. 12A are shown in FIGS. 6 and 7. Operation of the embodiment of the invention illustrated in FIG. 12A is exactly the same as for the invention of FIG. 5A.

FIG. 12B illustrates another embodiment of the present invention that utilizes an integrated magnetic transformer core. The embodiment of FIG. 12B is very similar to the embodiment of FIG. 12A in operation, but affords different flux paths whereby the center leg is a path for the DC flux component and the outer legs complete the magnetic circuit for the majority of AC flux from both of the magnetic circuits. In the embodiment of FIG. 12B, Transformer X has a ferrite core with legs 86, 87, and 85. Leg 85 has a gap as indicated at 95. The characteristic of gap 95 is determined to be such that at least a sufficient amount of energy is stored to effect continuous conduction conditions. A voltage source 100 provides input voltage to the switches SW1 through SW4. Windings P11, P12, P21, P22, S1, and S2 are just as for the embodiment of FIG. 12A, and have the same turns ratios. Diodes D1 and D2 rectify windings S1 and S2 respectively, to provide regulated power to a load connected to terminals +Vo and RETURN . Functionally, the magnetic circuit composed of leg 86 including the flux return path through leg 85 behaves magnetically just as the magnetic circuit for transformer X1 of FIG. 5A. The magnetic circuit of leg 87 including the return path through leg 85 behaves magnetically just as the magnetic circuit for transformer X2 of FIG. 5A. Thus, when the phase dots are positive, the reluctance of the path through leg 87 is determined principally by the gap 95 for storage of energy, and the reluctance of the path through leg 86 is determined principally by the gap 95 for release of energy. Thus a single gap in leg 85 serves to store and release energy for both phases of converter operation. This results in a simpler magnetic component. As for the converter of FIG. 5A, a continuous input current is maintained by the leakage inductance and cross-coupled capacitors while the output current is provided to the load through two forward biased rectifiers during the dead time to sustain continuous conduction operation. It should be noted that the description of operation and waveforms for the embodiments of FIGS. 12A and 12B are substantially the same as those given in reference to the embodiment of FIG. 5A.

Figure 13A:
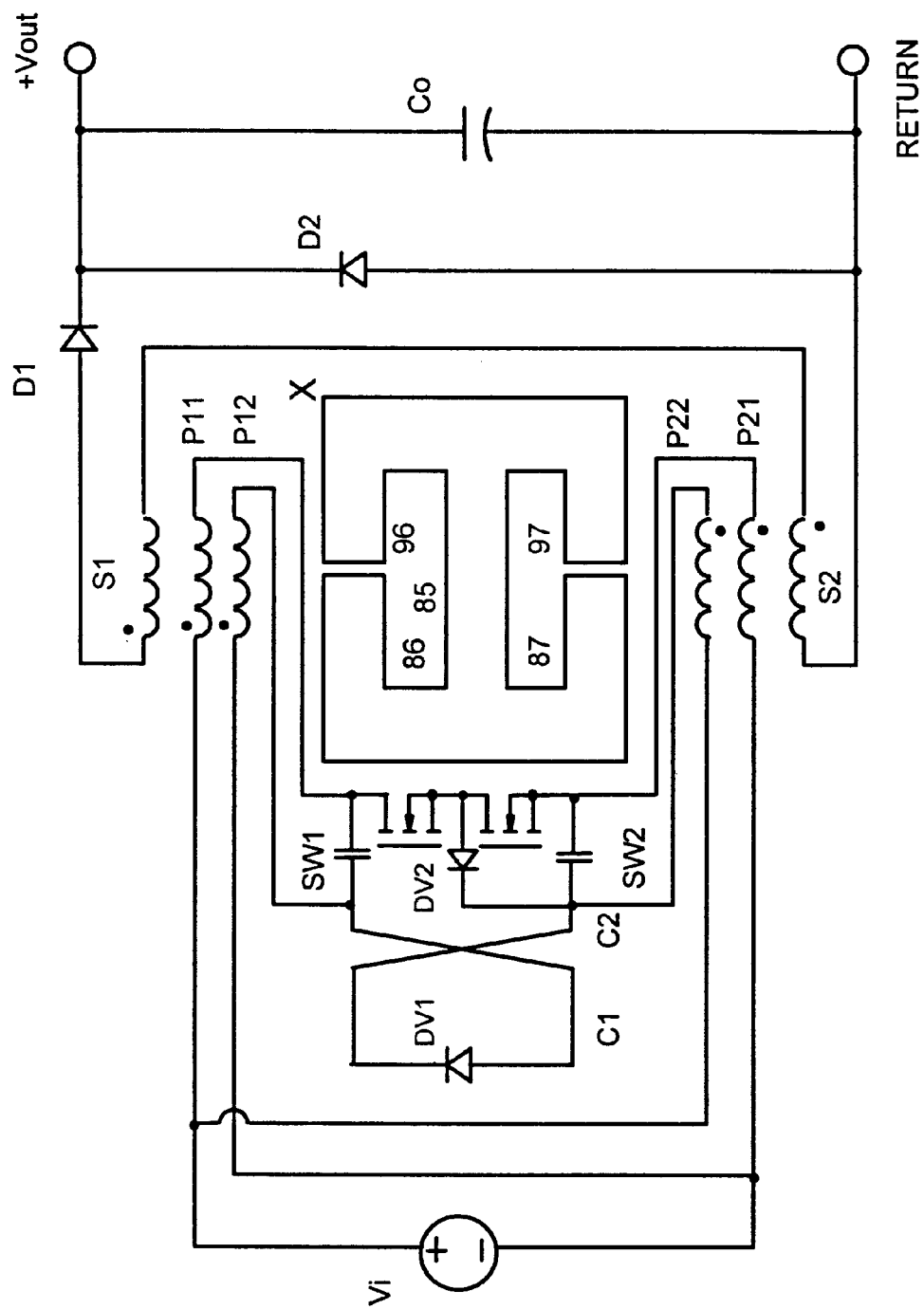
FIGS. 13A and 13B are semi-schematic diagrams of alternative embodiments of the invention that are implemented to two-switch integrated filter forward converter in two different integrated magnetic E-core structures.
Figure 13B:
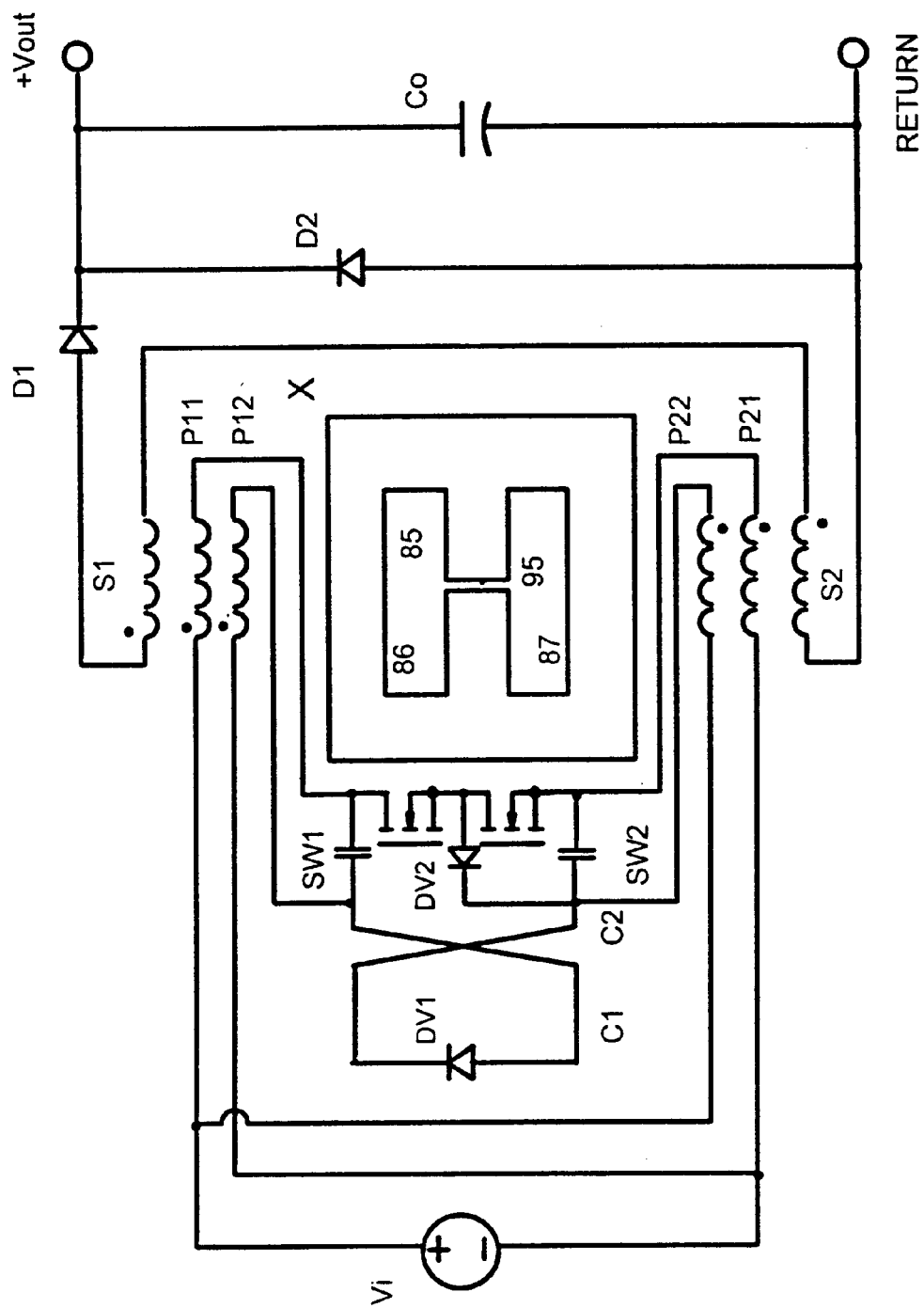
Figure 14A:
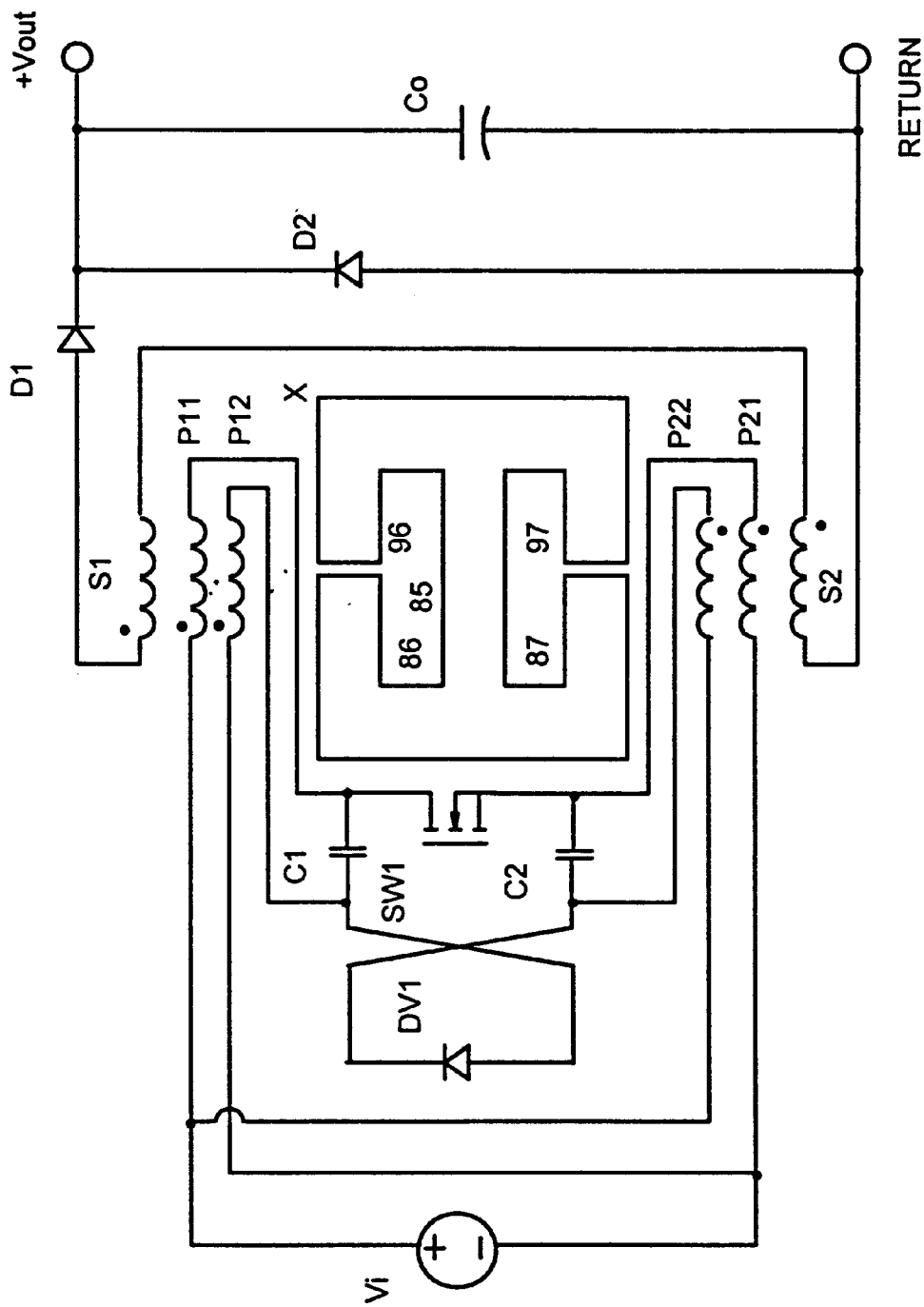
FIGS. 14A and 14B are semi-schematic diagrams of alternative embodiments of the invention that are implemented to single-switch integrated filter forward converter in two different integrated magnetic E-core structures.
Figure 14B:
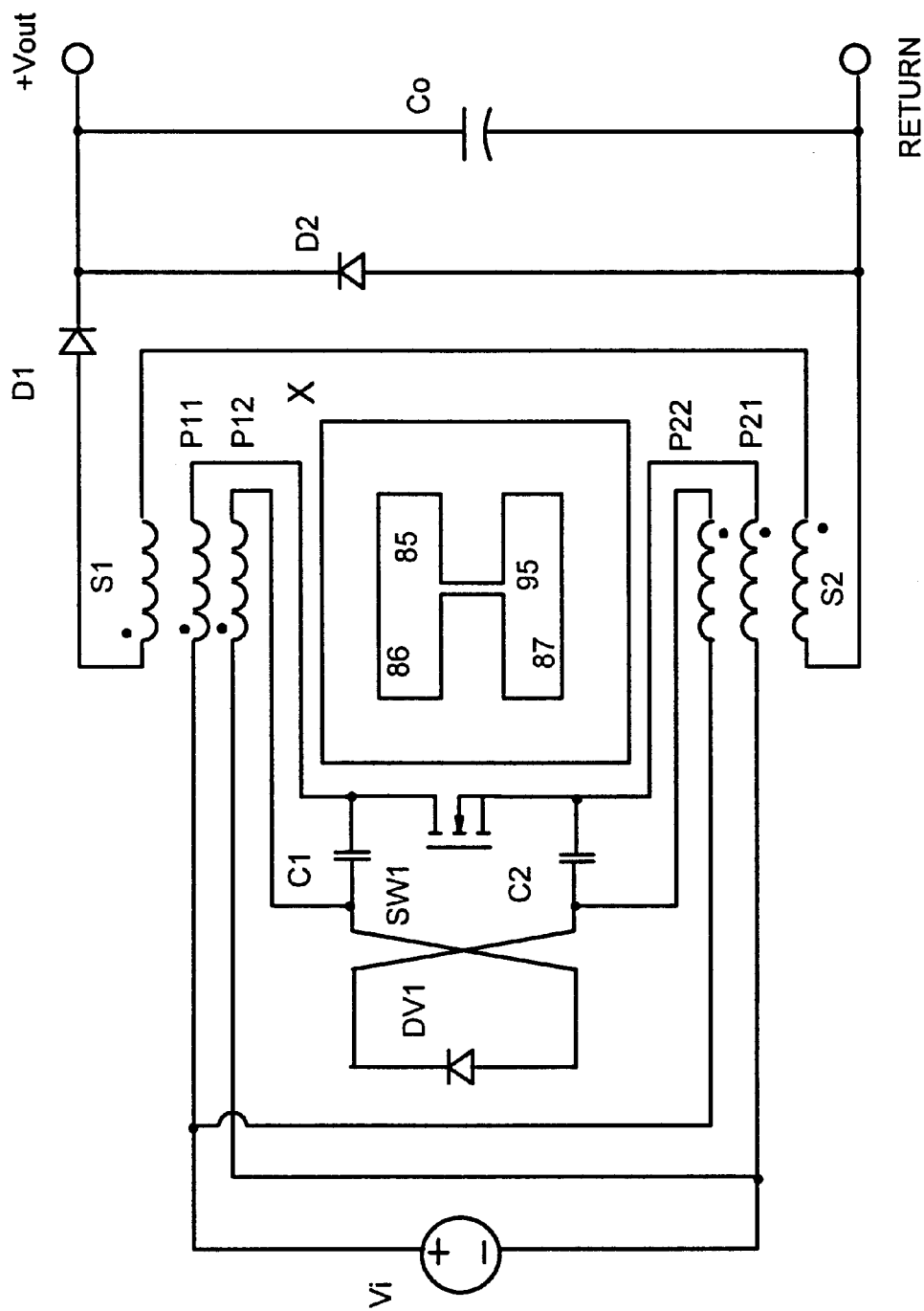

In the same manner, FIGS. 13A, 13B, 14A and 14B illustrate four embodiments of the present invention that utilizes an integrated magnetic transformer core. The descriptions of operation and waveforms for the embodiments of FIGS. 13A and 13B are substantially the same as those given in reference to the embodiment of FIG. 5B, two-switch integrated filter forward converter. On the other hand, the description of operation and waveforms for the embodiments of FIGS. 14A and 14B are substantially the same as those given in reference to the embodiment of FIG. 5C, single-switch integrated filter forward converter. Among them, the outer legs function as cores of the separate transformers, for coupling P11–P12 with S1 and P21–P22 with S2, while the center leg serves as a common path for returning the fluxes of the outer legs.

Further, the embodiments of FIGS. 12B, 13B and 14B operate quite advantageously with gaps in all three legs, and can effectively utilize the common technique of achieving equal gaps in all three legs of a ferrite E-core by placing spacers in the outer legs between assembled E-core halves.

The present inventions, with their inherent features and advantages, have been herein described with respect to various preferred embodiments. Nonetheless, other variations and implementations will be apparent to those skilled in the art, without departing from the scope of the invention. Accordingly, it is intended that the foregoing descriptions be exemplary in nature, and that such variations, changes, and modifications as will be apparent to those skilled in the art be included within the scope of the appended claims.

I claim:

1. A double two-switch integrated filter forward converter having magnetically integrated transformer and input filter functions for supplying power to a load, comprising:

a direct current voltage source having a positive electrode and a negative electrode;

a transformer having four primary windings and two secondary windings connected to the load; said primary windings and said secondary windings each having a first end and a second end;

the second end of a fourth of said primary windings and the first end of a first of said primary windings being connected to the positive electrode of the voltage source, the first end of a third of said primary windings and the second end of a second of said primary windings being connected to the negative electrode of the voltage source;

two series-connected power switches pairs and two common points disposed between the power switches;

a first pair of said series-connected power switches connected between the second end of said first primary winding and the first end of the second primary winding and defining a first of said common points disposed between the power switches for simultaneously turning on and off in response to a control signal;

a second pair of said series-connected power switches connected between the second end of the third primary winding and the first end of the fourth primary winding and defining a second of said common points disposed between the power switches for simultaneously turning on and off in response to the control signal;

a first diode connected between said second common point of said second power switches pair and the second end of the first primary winding;

a second diode connected between said first common point of said first power switches pair and the first end of the fourth primary winding;

a first capacitor connected between the second ends of the first and the third primary windings;

a second capacitor connected between the first ends of the second and the fourth primary windings;

a first of said secondary windings being connected in series with an anode of a first rectifier;

a second of said secondary windings being connected in series with an anode of a second rectifier;

said first rectifier and said second rectifier including cathodes connected together and defining a third common point;

a filter inductor connected between said third common point and terminal +Vo;

an output capacitor in parallel with said load between terminal +Vo and terminal RETURN means to form an output circuit.

2. A double two-switch integrated filter forward converter having magnetically integrated transformer, input and output filter functions for supplying power to a load, comprising:

a direct current voltage source having a positive electrode and a negative electrode;

a transformer primary winding means;

two transformers each having two primary windings and a secondary winding connected to a load;

each of said windings having a first end and a second end;

the second end of a second of said primary windings of a second of said transformers and the first end of a first of said primary windings of a first of said transformers being connected to the positive electrode of the voltage source, the first end of said second primary winding of said first transformer and the second end of said first primary winding of said second transformer being connected to the negative electrode of the voltage source;

two series-connected power switches pairs and two common points disposed between the power switches;

a first pair of said series-connected power switches connected between the second end of said first primary winding of said first transformer and the first end of the first primary winding of the said second transformer and defining a first of said common points disposed between the power switches for simultaneously turning on and off in response to a control signal;

a second pair of said series-connected power switches connected between the second end of the said second primary winding of the said first transformer and the first end of the second primary winding of the said second transformer and defining a said second common point between the power switches for simultaneously turning on and off in response to the control signal;

a first diode connected between said second common point of said second power switches pair and the second end of the first primary winding of said first transformer;

a second diode connected between said first common point of said first power switches pair and the first end of the second primary winding of said second transformer;

a first capacitor connected between the second ends of the first and the second primary windings of said first transformer; and a second capacitor connected between the first ends of the first and the second primary windings of said second transformer;

a first transformer secondary winding connected in series with a first rectifier means to form a first output circuit;

a second transformer secondary winding connected in series with a second rectifier means to form a second output circuit;

said first secondary winding being inductively coupled to said primary windings of said first transformer;

said second secondary winding being inductively coupled to said primary windings of said second transformer;

an output capacitor means connected in parallel with said load for receiving a first output current from said first output circuit and a second output current from said second output circuit.

3. The converter according to claim 2 wherein: said first transformer means and said second transformer means are separate and independent.

4. The converter according to claim 2 wherein said first transformer means and said second transformer means are implemented on a three leg E-core having first, second, and third legs; and said first transformer means consists of said first and second legs, and said second transformer means consists of said second and third legs.

5. A two-switch integrated filter forward converter having magnetically integrated transformer, input and output filter functions for supplying power to a load, comprising:

a direct current voltage source having a positive electrode and a negative electrode;

a transformer primary winding means;

two transformers each having two primary windings and a secondary winding connected to a load;

each of said windings having a first end and a second end;

the second end of a second of said primary windings of said second transformer and the first end of a first of said primary windings of said first transformer being connected to the positive electrode of the voltage source, the first end of said second primary winding of said first transformer and the second end of said first primary winding of said second transformer are connected to the negative electrode of the voltage source;

a series-connected power switches pair and a common point between the power switches;

said pair of series-connected power switches connected between the second end of the said first primary winding of the said first transformer and the first end of the first primary winding of the said second transformer and defining a said first common point between the power switches for simultaneously turning on and off in response to a control signal;

a first diode connected between the second end of the said second primary winding of the said first transformer and the first end of the second primary winding of the said second transformer;

a second diode connected between said common point of said power switches pair and the first end of the second primary winding of said second transformer;

a first capacitor connected between the second ends of the first and the second primary windings of said first transformer; and a second capacitor connected between the first ends of the first and the second primary windings of said second transformer;

a first transformer secondary winding connected in series with a first rectifier means to form a first output circuit;

a second transformer secondary winding connected in series with a second rectifier means to form a second output circuit;

said first secondary winding being inductively coupled to said primary windings of said first transformer;

said second secondary winding being inductively coupled to said primary windings of said second transformer;

an output capacitor means connected in parallel with said load for receiving a first output current from said first output circuit and a second output current from said second output circuit.

6. The converter according to claim 5 wherein said first transformer means and said second transformer means are separate and independent.

7. The converter according to claim 5 wherein said first transformer means and said second transformer means are implemented on a three leg E-core having first, second, and third legs; and said first transformer means consists of said first and second legs, and said second transformer means consists of said second and third legs.

8. A single-switch integrated filter forward converter having magnetically integrated transformer, input and output filter functions for supplying power to a load, comprising:

a direct current voltage source having a positive electrode and a negative electrode;

a transformer primary winding means;

two transformers each having two primary windings and a secondary winding connected to a load;

each of said windings having a first end and a second end;

the second end of a second of said primary winding of said second transformer and the first end of a first of said primary windings of said first transformer being connected to the positive electrode of the voltage source, the first end of said secondprimarywinding of said first transformer and the second end of said first primary winding of said second transformer are connected to the negative electrode of the voltage source;

a power switch connected between the second end of the said first primary winding of the said first transformer and the first end of the first primary winding of the said second transformer turning on and off in response to a control signal;

a first diode connected between the second end of the said second primary winding of the said first transformer and the first end of the second primary winding of the said second transformer;

a first capacitor connected between the second ends of the first and the second primary windings of said first transformer; and a second capacitor connected between the first ends of the first and the second primary windings of said second transformer;

a first transformer secondary winding connected in series with a first rectifier means to form a first output circuit;

a second transformer secondary winding connected in series with a second rectifier means to form a second output circuit;

said first secondary winding being inductively coupled to said primary windings of said first transformer;

said second secondary winding being inductively coupled to said primary windings of said second transformer;

an output capacitor means connected in parallel with said load for receiving a first output current from said first output circuit and a second output current from said second output circuit.

9. The converter according to claim 8 wherein said first transformer means and said second transformer means are separate and independent.

10. The converter according to claim 8 wherein said first transformer means and said second transformer means are implemented on a three leg E-core having first, second, and third legs; and said first transformer means consists of said first and second legs, and said second transformer means consists of said second and third legs.

* * * * *